United States Patent
Hegranes et al.

(10) Patent No.: US 10,984,660 B2
(45) Date of Patent: Apr. 20, 2021

(54) SYSTEMS AND METHODS FOR MULTI-CHANNEL REMOTE IDENTIFICATION OF AIRCRAFT

(71) Applicant: Kittyhawk.io, Inc., San Francisco, CA (US)

(72) Inventors: Jonathan Hegranes, San Francisco, CA (US); Andrew Elefant, San Francisco, CA (US); Michael Curry, San Francisco, CA (US); Joshua Ziering, San Francisco, CA (US)

(73) Assignee: Kittyhawk.io, Inc., San Francisco, CA (US)

( * ) Notice: Subject to any disclaimer, the term of this patent is extended or adjusted under 35 U.S.C. 154(b) by 251 days.

(21) Appl. No.: 16/392,832

(22) Filed: Apr. 24, 2019

(65) Prior Publication Data

US 2020/0312159 A1    Oct. 1, 2020

Related U.S. Application Data

(63) Continuation-in-part of application No. 16/363,883, filed on Mar. 25, 2019.

(51) Int. Cl.
  *G08G 5/00* (2006.01)
  *G06F 16/29* (2019.01)
  *G08G 5/04* (2006.01)

(52) U.S. Cl.
  CPC .......... *G08G 5/0017* (2013.01); *G06F 16/29* (2019.01); *G08G 5/0073* (2013.01); *G08G 5/04* (2013.01)

(58) Field of Classification Search
  CPC ...... G08G 5/0017; G08G 5/0073; G08G 5/04; G08G 5/0026; G08G 5/0069; G08G 5/0013; G08G 5/0008; G08G 5/0034; G08G 5/0082; G06F 16/29; G01S 5/0018; H04B 7/18506
  See application file for complete search history.

(56) References Cited

U.S. PATENT DOCUMENTS

| | | | |
|---|---|---|---|
| 6,430,412 B1 * | 8/2002 | Hogg | H04W 36/30 455/436 |
| 9,124,580 B1 * | 9/2015 | Sampigethaya | H04B 3/54 |
| 9,742,441 B2 * | 8/2017 | Whitaker | H04B 1/28 |

(Continued)

*Primary Examiner* — Mary Cheung
(74) *Attorney, Agent, or Firm* — Ansari Katiraei LLP; Arman Katiraei; Sadiq Ansari

(57) ABSTRACT

An aircraft detection system supplements the identification of aircraft with information that is obtained from two or more different detection channels. The system may obtain a first set of identifying information about a particular aircraft or flight via a first detection channel at a first time, may determine that the first set of identifying information lacks commonality with previously received sets of identifying information for other detected aircraft of flights, and may track the particular aircraft or flight based on the first set of identifying information. The system may then obtain a second set of identifying information via a different second detection channel at a second time, may determine commonality between the second set of identifying information and the first set of identifying information, and may update the tracking of the particular aircraft or flight by incorporating or adding identifying information from the second set of identifying information.

20 Claims, 17 Drawing Sheets

(56) References Cited

U.S. PATENT DOCUMENTS

2018/0375568 A1* 12/2018 De Rosa ............... H04W 72/04
2019/0244528 A1*  8/2019 Srinivasan ........... G08G 5/0013
2020/0287619 A1*  9/2020 Tavner ................. G05D 1/0022

* cited by examiner

SYSTEMS AND METHODS FOR MULTI-CHANNEL REMOTE IDENTIFICATION OF AIRCRAFT

CLAIM OF BENEFIT TO RELATED APPLICATIONS

This application is a continuation-in-part of U.S. nonprovisional application Ser. No. 16/363,883, entitled "Systems and Methods for Multi-Channel Remote Identification of Aircraft", filed Mar. 25, 2019. The contents of application Ser. No. 16/363,883 are hereby incorporated by reference.

BACKGROUND INFORMATION

Airspace is becoming more populated with the proliferation of drones and other aircraft, and with expanded uses of these aircraft for recreational, delivery, personal transportation, and/or other services. Some of these flights may not be monitored or tracked by local municipalities, air control towers, regulatory agencies (e.g., the Federal Aviation Administration), or others because existing radar technology cannot detect the aircraft or because the aircraft are currently not subject to tracking or regulation.

As such, there is the potential for conflicted airspace. Different operators may fly aircraft in the same region of airspace without knowledge of the other flights that could disrupt the operations or flight plan of one or more operators, result in damage to the aircraft or injury to property or people, or create other situations that could have been avoided had the aircraft been identified and tracked during flight.

DETAILED DESCRIPTION OF PREFERRED EMBODIMENTS

Figure 1:
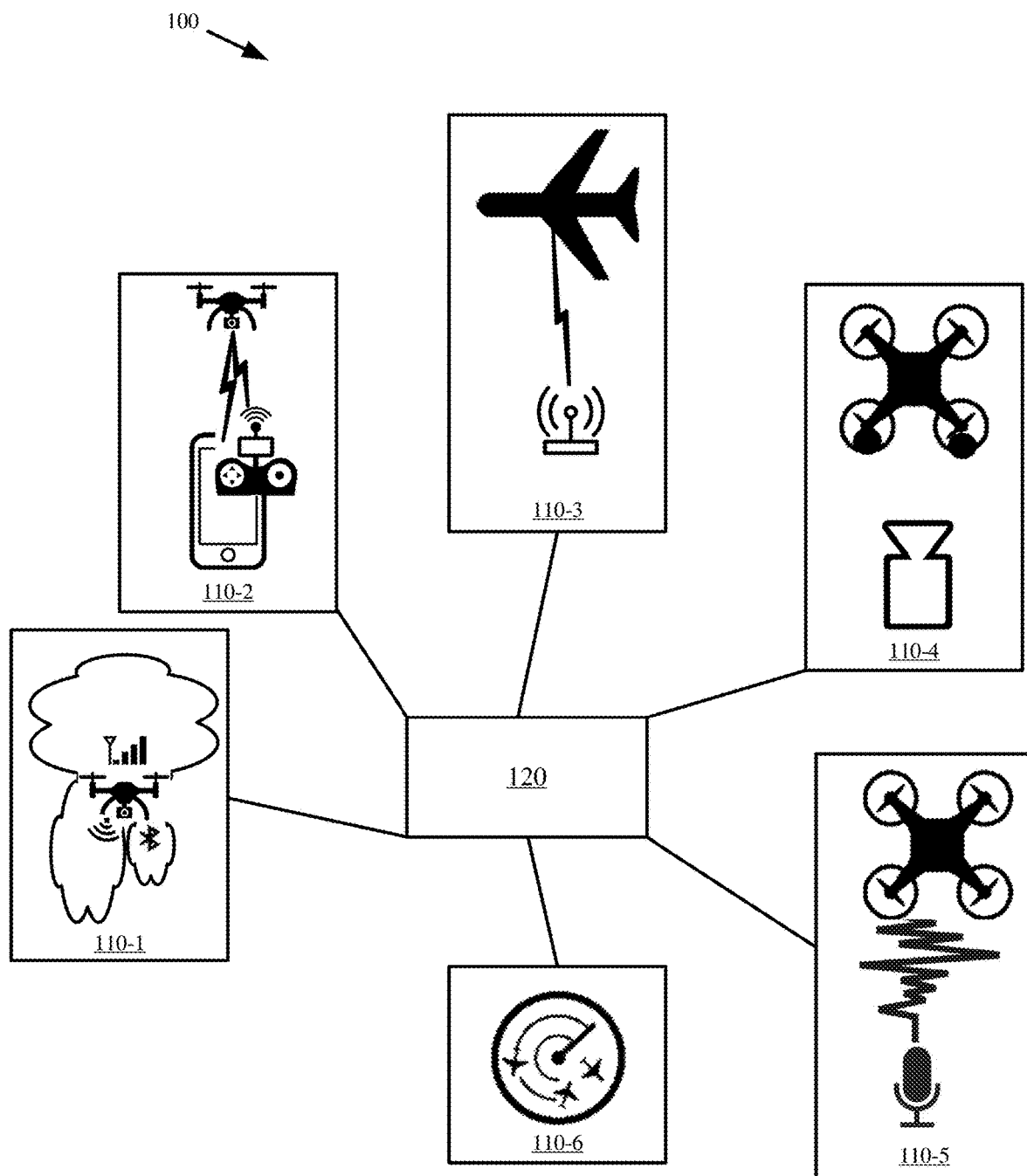
FIG. 1 illustrates an example of an aircraft detection system identifying different aircraft via different detection channels in accordance with some embodiments presented herein.

The following detailed description refers to the accompanying drawings. The same reference numbers in different drawings may identify the same or similar elements.

Systems and methods, as described herein, provide an aircraft detection system that performs multi-channel remote identification of aircraft. In particular, the aircraft detection system may use two or more different detection channels to identify different aircraft (during flight or upon activation) regardless of whether the aircraft use different forms of self-identification or do not self-identify during flight or upon activation.

The different detection channels may supplement, enhance, and/or replace traditional radar-based identification of aircraft. For instance, each detection channel may use different networks, connectivity, broadcasts, visual, acoustic, and/or other means to identify aircraft. In some embodiments, the multi-channel remote identification may use a distributed set of devices and sensors, ranging from specialized air tracking equipment to user equipment, to form the different detection channels.

By virtue of using the different detection channels, the aircraft detection system may identify and/or track aircraft that may otherwise be undetectable by traditional radar systems or other systems that rely on a single detection channel. In other words, the aircraft detection system may perform the multi-channel remote identification and may use the two or more detection channels as alternate means with which to identify aircraft that may go undetected with one or more of the detection channels. Accordingly, the aircraft detection system may adapt to different types of aircraft, and may provide a comprehensive solution for identifying and tracking commercial aircraft as well as smaller aircraft or aircraft flying at lower altitudes, such as drones or other Unmanned Aerial Vehicles ("UAVs").

In some embodiments, the aircraft detection system may perform the multi-channel remote identification in order to accelerate aircraft identification. More specifically, the aircraft detection system may perform the multi-channel remote identification in order to identify aircraft via whichever of the two or more detection channels is able to detect aircraft fastest. Accordingly, the multi-channel remote identification may identify aircraft faster than traditional systems that use a single detection channel.

The multi-channel remote identification may include identifying aircraft that is activated or flying in a given airspace, obtaining different identifying information about the identified aircraft, and obtaining and/or tracking a position of the identified aircraft via the one or more detection channels. Different aircraft identifying information may be obtained from the different detection channels. At the very least, each detection channel is used to identify the presence of aircraft in a relative area.

The aircraft detection system may assign a unique identifier to each identified aircraft, and may associate the identifier to the relative position of the corresponding identified aircraft. In some embodiments, the identifier may provide additional identifying information about the identified aircraft. For instance, the identifier may identify the category, class, and/or type of the identified aircraft as well as provide other information about the aircraft, aircraft operator, or flight. In some embodiments, the additional identifying information may be linked to or accessed from the identifier.

The aircraft detection system may aggregate information about aircraft identified from the different detection channels and their relative positioning to form a real-time accounting of different aircraft operating in different airspace. Users, regulating agencies, and/or others may access the aircraft detection system in order to determine airspace activity, create flight plans, and/or adjust existing flight plans based on the identification of other aircraft operating in the same airspace.

FIG. 1 illustrates an example of aircraft detection system 100 identifying different aircraft via different detection channels in accordance with some embodiments presented herein. As shown in FIG. 1, aircraft detection system 100 may include six detection channels 110-1, 110-2, 110-3, 110-4, 110-5, and 110-6 (herein sometimes collectively referred to as "detection channels 110" or individually as "detection channel 110") from which aircraft detection device 120 may detect different aircraft. In some other embodiments, aircraft detection device 120 may use more, less, or different detection channels 110 to detect aircraft.

First detection channel 110-1 may include different short-range wireless networks, long-range wireless networks, radio frequencies, and/or other characteristics of wireless signaling used by different aircraft to communicate. In some embodiments, the multi-channel remote identification via first detection channel 110-1 may include identifying aircraft based on the wireless networks, radio frequencies, and/or other signaling that are generated by the aircraft in order to communicate with a remote controller, device, or other system.

Aircraft detection device 120 may identify aircraft via first detection channel 110-1 by connecting and/or communicating with one or more devices or sensors that are in wireless network range or radio frequency range of different aircraft and that detect the signaling and/or messaging for or from the aircraft over the different wireless networks or radio frequencies. In some embodiments, the multi-channel remote identification via first detection channel 110-1 may include using one or more devices or sensors that are within the messaging path of the one or more networks used by aircraft to communicate with other devices. The devices or sensors in the network path may identify aircraft based on messaging for or from the aircraft passing over the one or more networks, and may provide aircraft identifying information to aircraft detection device 120 based on the messaging. For instance, aircraft detection device 120 may obtain access to anonymized data packets that pass through a telecommunications network and that are directed to a particular port, Internet Protocol ("IP") address, domain name, or other identifier associated with remote controlled aircraft. Examples of some networks by which to identify aircraft via first detection channel 110-1 include different WiFi networks, different Bluetooth networks, proprietary networks operating in 2.4 gigahertz ("GHZ"), 5.8 GHZ, and/or other frequencies, cellular networks, and/or other Wide Area Networks ("WANs").

Positioning of aircraft identified via first detection channel 110-1 may be determined relative to the position of the device or sensor that detects the wireless network, radio frequencies, and/or signaling used to communicate with the aircraft. For example, a device may detect a WiFi network created by a particular drone, and the device may provide its positioning along with identifying information about the aircraft to aircraft detection device 120. Aircraft detection device 120 may track movements of the aircraft in airspace based on changes to the signal strength between the detecting device and the aircraft. For instance, the signal strength for the WiFi network created by the particular drone decreases as the particular drone flies further away from the detecting device, and increases as the particular drone flies closer to the detecting device.

Positioning of aircraft identified via first detection channel 110-1 may also be determined via signal triangulation or a network point of origin. For instance, aircraft, that communicate via a cellular network, may connect to the network via a particular Radio Access Network ("RAN"). The relative positioning of the aircraft may therefore be determined by identifying the location of the RAN from which data packets sent by the aircraft originate. Aircraft detection device 120 may track movements of the aircraft by tracking the location of the different RANs that the aircraft uses to access the network. Similarly, the relative positioning of the aircraft may be determined based on the IP address that is assigned to the aircraft by a network, and geolocating that IP address to a specific RAN or geographic region.

Second detection channel 110-2 may include devices that control different aircraft, and that relay or provide data about the controlled aircraft to aircraft detection device 120. In some embodiments, second detection channel 110-2 may include devices that communicate with the aircraft over a first network (e.g., a WiFi or Bluetooth network) or first radio frequency, and that relay data about the connected aircraft to aircraft detection device 120 over a different second network (e.g., a WAN) or different second radio frequency. For instance, the devices may run an application that provides aircraft and/or flight information to aircraft detection system 100, or that uses aircraft detection system 100 for other services in exchange for sharing the aircraft and/or flight information.

Aircraft detection device 120 may determine relative positioning of aircraft identified via second detection channel 110-2 based on positioning of the device that controls the aircraft when the device is geographically proximate to the aircraft (e.g., a remote controller that uses WiFi, Bluetooth, or other wireless connectivity to control the aircraft), and when the device has a geolocation or geopositioning sensor. Aircraft detection device 120 may alternatively determine positioning of aircraft identified via second detection channel 110-2 based on flight tracking information the device provides for the controlled aircraft. For instance, the aircraft may have its own geolocation or geopositioning sensor, may provide the positioning data to the controller, and the controller may relay the positioning data to aircraft detection device 120. The flight tracking information further enables aircraft detection device 120 to accurately track movements of the aircraft across different airspace.

Third detection channel 110-3 may include devices or sensors that receive broadcast messaging from different aircraft, and that provide aircraft identification information to aircraft detection device 120 based on the received broadcast messaging. In some embodiments, the multi-channel remote identification via third detection channel 110-3 may include connecting to and/or communicating with air traffic control ground stations, radios, and/or other devices that are turned to receive messages that are periodically broadcast by aircraft during flight. The aircraft may broadcast the messages without establishing connections to the broadcast message receiving devices. The messages may be broadcast according to defined formats and/or defined frequencies.

Aircraft detection device 120 may obtain positioning of aircraft identified via third detection channel 110-3 when the broadcast messaging includes the location of the aircraft. For example, the identified aircraft may issue Automatic Dependent Surveillance-Broadcast ("ADS-B") messages, and each message may include the position of the aircraft as determined from satellite navigation and/or other systems. Aircraft detection device 120 may obtain a feed of the ADS-B message in order to determine the position of the aircraft and further track flight. Alternatively, aircraft detection device 120 may determine a relative position of the identified aircraft based on the position of the device or sensor that receives the broadcast message from the identified aircraft. Aircraft detection device 120 may track flight of the aircraft based on the position of different devices or sensors that receive the broadcast messages from the same aircraft.

Fourth detection channel 110-4 may identify aircraft based on sight. In some embodiments, the multi-channel remote identification via fourth detection channel 110-1 may include using one or more devices or sensors that are within visible range of different aircraft to identify visual features of the aircraft, and to provide aircraft identifying information to aircraft detection device 120 based on the identified visual features. In some embodiments, the devices or sensors may include cameras or other imaging sensors to take images of the aircraft, monitor flight patterns, capture emitted light from the aircraft, and/or other visual features of the aircraft. The devices, sensors, or aircraft detection device 120 may be able to differentiate between different aircraft based on one or more of these visual features. For instance, aircraft detection device 120 may identify different aircraft based on one or more lights flashing in different patterns, different sequences, with different colors, with different intensities, for different durations, and/or other characteristics. The lights can be used to encode messages that provide aircraft identifying information and/or positional information. For instance, one or more lights can be flashed in a manner that produces a binary-encoded message for identifying any of the make, model, type, or other information about the aircraft.

Fifth detection channel 110-5 may identify aircraft based on sound. In some embodiments, the multi-channel remote identification via fifth detection channel 110-5 may include using one or more devices or sensors that are within audible range of the aircraft to capture a sound signature of the aircraft in flight, and to provide aircraft identifying information to aircraft detection device 120 based on the captured sound signature. For instance, aircraft detection device 120 may differentiate between different aircraft based on the frequency, loudness, pitch, tone, and/or other acoustic characteristic of the sound generated by different aircraft during flight. The aircraft may also use speakers to emit sound at specific frequencies, and may encode various messages based on the frequency, amplitude, pulse, intensity, and/or other characteristics of the sound.

Aircraft detection device 120 may determine relative positioning of aircraft identified via fourth detection channel 110-4 or fifth detection channel 110-5 based on positioning data of the device or sensor that obtained the images or sound signature of the aircraft. In some embodiments, aircraft detection device 120 may further track the movements of the aircraft based on changing appearance of the aircraft visual features or changing sound of the aircraft relative to the position of the device or sensor used to capture the visual feature or sound. For instance, the aircraft position may be tracked via time-of-flight measurements obtained from the emitted light or sound from the aircraft.

Sixth detection channel 110-6 may correspond to radar-based or satellite-based aircraft identification. In some embodiments, the multi-channel remote identification via sixth detection channel 110-6 may include accessing air traffic control systems, ground-based radars, or flight tracking satellites in order to obtain identifying information about aircraft tracked via radar and/or satellite. Sixth detection channel 110-6 may therefore represent an existing detection channel by which commercial aircraft are tracked. Sixth detection channel 110-6 may be unable to detect smaller aircraft (e.g., drones, UAV, etc.) or aircraft flying in different classes of airspace. However, by integrating the other detection channels 110 as part of aircraft detection system 100, airspace detection system 100 may be able to identify and track different types of aircraft in different airspace.

In some embodiments, aircraft detection system 100 may use additional or other detection channels to identify different aircraft in different airspace. For instance, aircraft detection system 100 may integrate with a distributed set of devices or sensors that detect Radio Frequency Identifiers ("RFIDs") transmitted by aircraft when activated or during flight, or that detect aircraft messaging transmitted over other unlicensed communication channels or unlicensed spectrum.

Aircraft detection device 120 may aggregate information from different detection channels 110 in order to provide a comprehensive accounting of identified aircraft and their relative positioning in different airspace. In some embodiments, aircraft detection device 120 may assign an identifier to identify each aircraft detected via one or more of detection channels 110, and may map the identifier to a corresponding position of the identified aircraft.

Figure 2:
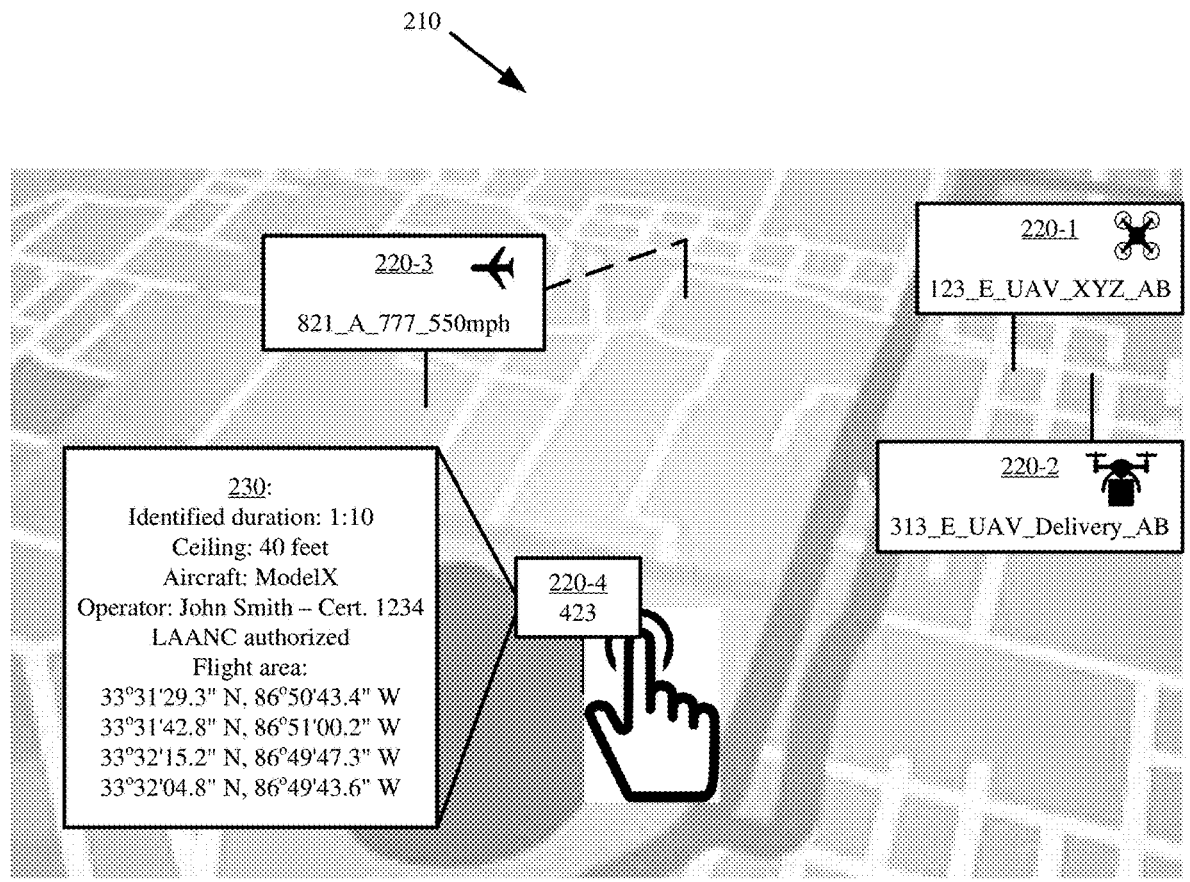
FIG. 2 illustrates an example of the aggregated information obtained by an aircraft detection device via different detection channels in accordance with some embodiments.

FIG. 2 illustrates an example of the aggregated information obtained by aircraft detection device 120 via detection channels 110 in accordance with some embodiments. FIG. 2 may include Graphical User Interface ("GUI") 210 that provides a map of some region of airspace. Aircraft detection device 120 may populate GUI 210 with identifiers 220-1, 220-2, 220-3, and 220-4 (herein sometimes collectively referred to as "identifiers 220" or individually as "identifier 220") for different aircraft that were detected via detection channels 110.

Each identifier 220 may be presented at a position corresponding to where the aircraft, identified by that identifier 220, was identified. Aircraft detection device 120 may also monitor movements of the aircraft via detection channels 110, and may reposition the corresponding identifiers 220 based on the tracked movements.

In some embodiments, each identifier 220 may provide or contain additional information about an identified aircraft. For instance, the value (e.g., sequence of alphanumeric characters) of identifier 220-1 may specify a first set of characters (e.g., "123") to uniquely differentiate the identified aircraft from other identified aircraft, a second set of characters (e.g., "E1") to identify the altitude or expected altitude range for the identified aircraft, a third set of characters (e.g., "UAV_XYZ") to identify the category, class, type, make, and/or manufacturer of the identified aircraft, and a fourth set of characters (e.g., "AB") to identify one or more detection channels 110 used to identify the aircraft.

Other identifiers 220 may include more, less, or different identifying data about the aircraft, flight, flight operator, purpose, etc. based on the data that can be obtained from the detection channel 110 used to identify the aircraft. For instance, identifier 220-2 may identify aircraft that is operated by a particular package delivery company. Some identifiers 220 may provide an icon of the identified aircraft type or may provide an exact image of the aircraft if obtained via imaging from fourth detection channel 110-4 or data from other detection channels 110.

Different detection channels 110 may provide different additional identifying data about identified aircraft. For instance, flight altitude may be estimated from fourth and fifth detection channels 110-4 and 110-5, whereas first and second detection channels 110-1 and 110-2 may provide detailed information about the aircraft as well as exact altitude, speed, trajectory, and/or other flight parameters.

In some embodiments, identifiers 220 may not be encoded with the additional information. Instead, identifiers 220 may link to the additional identifying information about the aircraft or flight. For example, when a user selects or otherwise interacts with identifier 220-4, GUI 210 may present additional identifying information 230 about the aircraft and/or flight gathered via detection channels 110.

In some embodiments, the aggregated information of identified aircraft, aircraft positioning, and/or other identifying information about the identified aircraft, flights, operators, purposes, etc. may be provided via an Application Programming Interface ("API") or may be accessed programmatically. For instance, an application may query aircraft detection device 120 for aircraft in a particular region of airspace represented by GUI 210, and aircraft detection device 120 may return identifiers 220 and/or positioning information associated with each identifier 220. The application may then query aircraft detection device 120 using identifier 220-4 in order to receive a data structure that is populated with additional identifying information 230.

Figure 3:
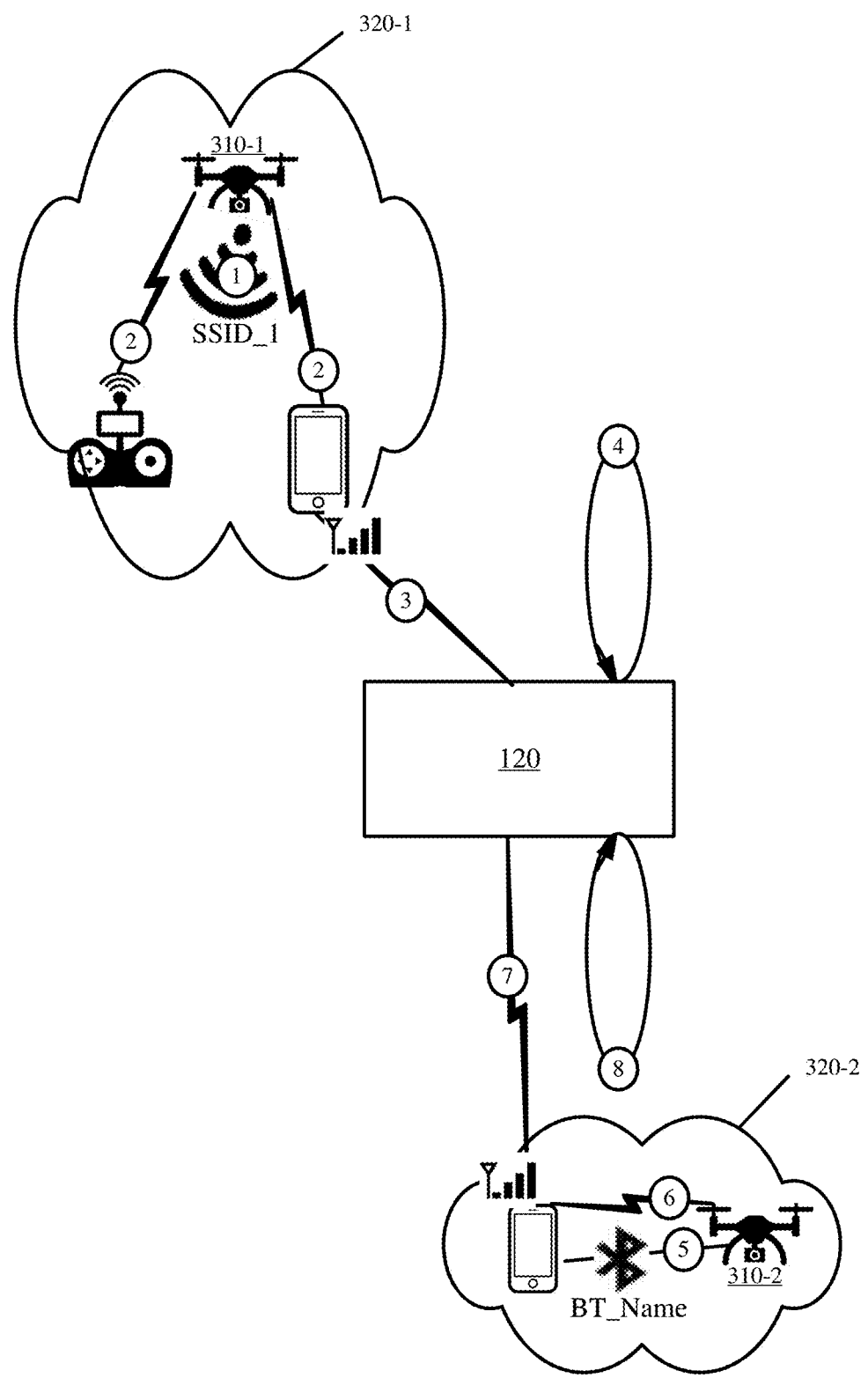
FIG. 3 illustrates an example of multi-channel remote identification of aircraft via a first detection channel in accordance with some embodiments described herein.

FIG. 3 illustrates an example of multi-channel remote identification of aircraft via first detection channel 110-1 in accordance with some embodiments described herein. FIG. 3 includes aircraft detection device 120, first aircraft 310-1, second aircraft 310-2, first network 320-1, and second network 320-2. First aircraft 310-1 and second aircraft 310-2 are herein sometimes collectively referred to as "aircraft 310" or individually as "aircraft 310". First network 320-1 and second network 320-2 are herein sometimes collectively referred to as "networks 320" or individually as "network 320".

In FIG. 3, first aircraft 310-1 communicates and/or is controlled via messaging exchanged over a WiFi network that corresponds to first network 320-1. First aircraft 310-1 may create first network 320-1 in order to communicate with a controller that is within WiFi range of first aircraft 310-1.

To create first network 320-1, first aircraft 310-1 may broadcast (at 1) a particular Service Set Identifier ("SSID") that identifies first network 320-1 and/or first aircraft 310-1 to nearby WiFi-enabled devices that are within WiFi signaling range of first aircraft 310-1. In FIG. 3, the controller that is used to control first aircraft 310-1 and/or another WiFi-enabled device that is in range of first network 320-1 may detect the particular SSID.

Each SSID receiving device may connect (at 2) to first aircraft 310-1 using first network 320-1, and may exchange one or more messages with first aircraft 310-1 in order to identify first aircraft 310-1, obtain additional identifying information about first aircraft 310-1, and/or control first aircraft 310-1. Alternatively, the SSID receiving device may identify first aircraft 310-1 and/or other identifying information directly from the formatting or contents of the particular SSID. For instance, the SSID may be formatted to differentiate first aircraft 310-1 from other WiFi networks, and/or various properties of first aircraft 310-1 (e.g., make, model, airspace class, etc.).

In some embodiments, devices may detect first aircraft 310-1 via other signaling transmitted by first aircraft 310-1. For instance, the devices may identify first aircraft 310-1 based on specific radio frequencies, messages of standard or proprietary network protocols, signaling characteristics, and/or other communication methods used by first aircraft 310-1 or a by a particular type of aircraft to communicate via first network 310-1.

One or more devices that detect first aircraft 310-1 may provide (at 3) identifying data about identified first aircraft 310-1 to aircraft detection device 120 via a cellular network or other long-range network. The detecting devices may also provide (at 3) geographic coordinates to identify a position of first aircraft 310-1. For instance, a detecting device may use a Global Positioning System ("GPS") module of first aircraft 310-1 or of the detecting device to obtain geolocational or geopositional coordinates, and may provide the coordinates along with the identifying information to aircraft detection device 120. The detecting device may also track movements of first aircraft 310-1 based on the GPS module on first aircraft 310-1 (e.g., when connected to and/or controlling first aircraft 310-1) or based on changes to the signal strength of first network 320-1 as first aircraft 310-1 flies closer to or further away from the detecting device.

In response to receiving (at 3) the identifying information for first aircraft 310-1, aircraft detection device 120 may assign (at 4) an identifier to identify first aircraft 310-1. Aircraft detection device 120 may map the identifier to a corresponding position where first aircraft 310-1 or first network 320-1 is detected.

Second aircraft 310-2 may not communicate via first network 320-1 or may be outside the range of first network 320-1. In some embodiments, second aircraft 310-2 may communicate and/or may be controlled via messaging exchanged over a second network 320-2 (e.g., a Bluetooth network or a different WiFi network) that is different than first network 320-1. In some embodiments, second aircraft 310-2 may communicate using frequencies, communication protocols, signaling, and/or other communication methods that differentiate second network 320-2 from first network 320-1.

As shown in FIG. 3, second aircraft 310-2 may create second network 320-2, and may broadcast (at 5) a name or identifier with which a Bluetooth-enabled device that is in Bluetooth range of second aircraft 310-2 may use to connect to second aircraft 310-2. A nearby device may receive the broadcast name or identifier, or may detect specific messages or frequencies transmitted over second network 320-2 that identify second aircraft 310-2.

The device may connect (at 6) to second aircraft 310-2, and may exchange one or more messages with second aircraft 310-2 in order to identify second aircraft 310-2, obtain additional identifying information about second aircraft 310-2, and/or control second aircraft 310-2. The device may alternatively identify second aircraft 320-2, without connecting to second aircraft 320-2, based on the broadcast name or identifier, frequencies, signaling characteristics, network protocols, or other communication methods of second network 320-2.

The device may transmit (at 7) identifying information about second aircraft 310-2 to aircraft detection device 120. In some embodiments, the identifying information may indicate the presence of aircraft and a position of the detecting device. In some other embodiments, the identifying information may provide more detailed information about second aircraft 310-2 (e.g., category, class, type, etc.), flight parameters, information about the flight operator, flight purposes, and/or information used to identify and/or track second aircraft 310-2.

In response to receiving (at 7) the identifying information for second aircraft 310-2, aircraft detection device 120 may determine if the identifying information and positional information matches to any previously identified aircraft. In other words, aircraft detection device 120 may determine if the identifying information identifies a common aircraft that was previously identified via identifying information provided by another device or a different detection channel 110. Aircraft detection device 120 may determine that the identifying information is for newly identified aircraft (e.g., different aircraft than first aircraft 310-1) when the identifying information differentiates from other identified aircraft, or a position at which other aircraft have not been identified. In response to determining that second aircraft 310-2 was not previously identified, aircraft detection device may assign (at 8) a different second identifier to differentiate second aircraft 310-2 from first aircraft 310-1 and other identified aircraft, and may map the second identifier to a corresponding position where second aircraft 310-2 or second network 320-2 is detected.

First communication channel 110-1, and specifically the different wireless networks, frequencies, protocols, signaling characteristics, and/or other communication methods of first communication channel 110-1, allow aircraft detection device 120 to identify first aircraft 310-1 and second aircraft 310-2 even when the different aircraft 310 communicate using different network technologies. Moreover, first communication channel 110-1 allows aircraft detection device 120 to identify first aircraft 310-1 and second aircraft 310-2 using any device with a wireless radio that is within range of the signaling transmitted by the aircraft 310 regardless of whether the identifying device is a controller of the aircraft or a mobile device of a user that is within wireless range of aircraft 310.

In some embodiments, first communication channel 110-1 may include other wireless networks that can be used to identify aircraft 310 in addition to or instead of the WiFi and Bluetooth networks illustrated in FIG. 3 as first network 320-1 and second network 320-2 respectively. For instance, first communication channel 110-1 may include one or more of Third Generation ("3G"), Fourth Generation ("4G"), Long Term Evolution ("LTE"), Fifth Generation ("5G"), and/or other cellular networks. Similarly, aircraft 310 may be detected based on the different frequencies, network protocols, messaging, signaling characteristics, and/or communication methods that the aircraft 310 use to communicate over these and other wireless networks.

In some embodiments, aircraft detection device 120 may identify aircraft via one or more cellular networks based on the aircraft and/or aircraft controllers registering with the cellular network through a RAN of the cellular network for network access. For instance, when aircraft register with the cellular network, the cellular network may identify the registrant to be aircraft (e.g., device type), and may provide the registration information to aircraft detection device 120.

In some embodiments, aircraft detection device 120 may identify aircraft based on messaging communicated from or to the aircraft over the cellular networks. For instance, aircraft detection device 120 may obtain a feed from different RANs or gateways of the network that filter and provide aircraft detection device 120 with the messaging communicated from or to the aircraft. The messaging can be identified based on specific port numbers, IP addresses, Media Access Control ("MAC") addresses, domain names, Uniform Resource Locators ("URLs"), and/or other identifiers. For instance, aircraft detection device 120 may utilize Multi-Access Edge Compute ("MEC") resources of a telecommunications network to identify the desired messaging. Alternatively, aircraft detection device 120 may obtain the messaging from different aircraft control cloud systems that the aircraft or aircraft controllers communicate with via the cellular networks.

As noted above, one of the advantages of the multi-channel remote identification (e.g., identifying aircraft via the different wireless networks of first detection channel 110 and via other detection channels 110) is the ability to rapidly identify aircraft via whichever detection channel first identifies the aircraft. Accordingly, aircraft detection system 100 is not limited to waiting for aircraft to satisfy the criteria of a single detection channel 110 before that aircraft can be identified. The faster identification of aircraft provided by the multi-channel remote identification can thereby increase safety and reduce airspace conflict by providing an accurate account of aircraft in airspace without unnecessary delay associated with aircraft satisfying criteria of a single detection channel before they are identified.

Figure 4:
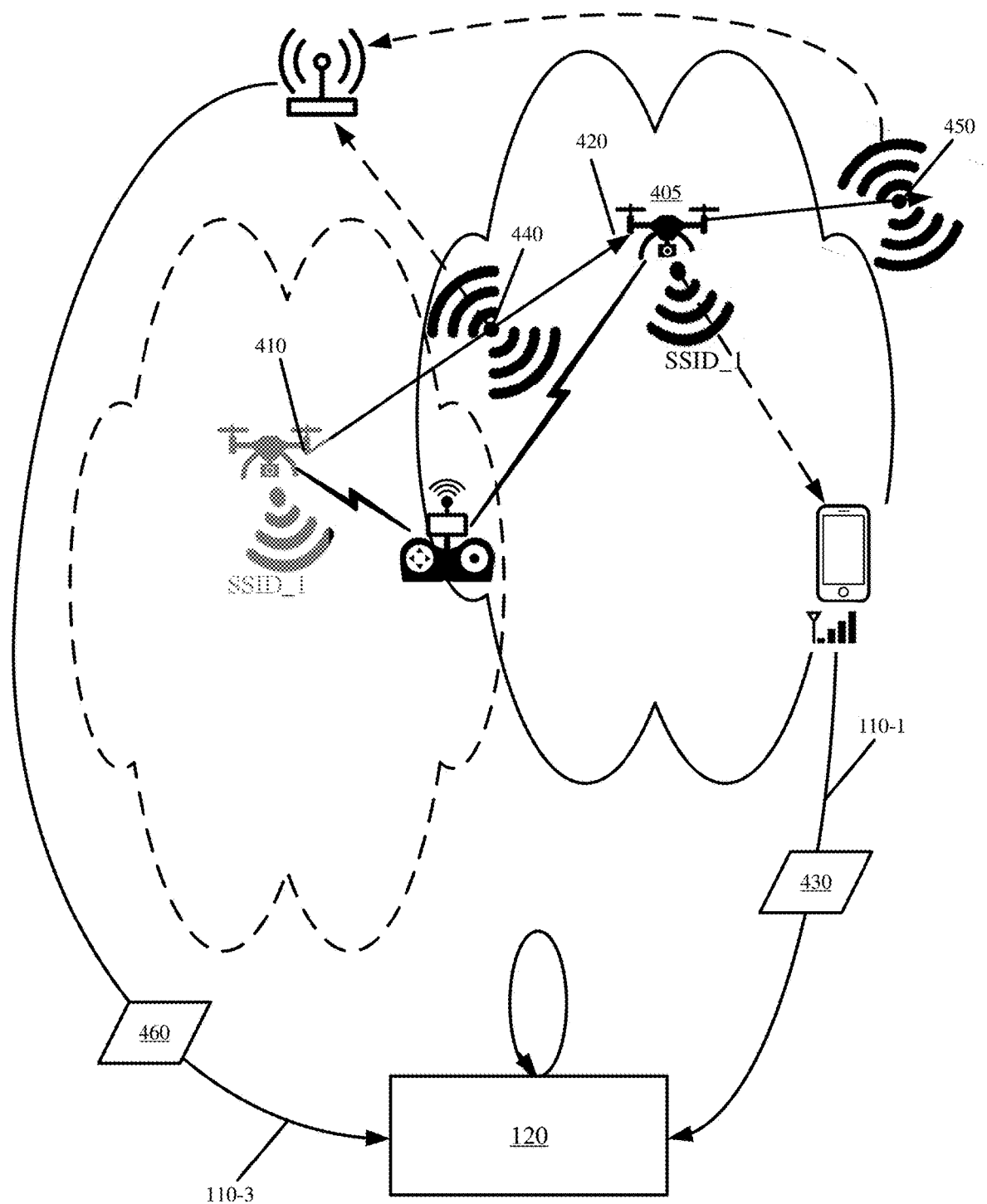
FIG. 4 illustrates an example of using different detection channels to accelerate the identification of aircraft in accordance with some embodiments described herein.

FIG. 4 illustrates an example of using different detection channels 110 to accelerate the identification of aircraft 405 in accordance with some embodiments described herein. In particular, FIG. 4 illustrates aircraft detection device 120 identifying aircraft 405 based on whichever of first detection channel 110-1 or third detection channel 110-3 first provides identifying data about aircraft 405.

Each detection channel 110 may be associated with a different delay or latency. The different delay or latency may be the result of different detection channels 110 identifying aircraft 405 at different times based on aircraft 405 satisfying the identification criteria of the different detection channels 110 at different times.

For instance, and as shown in FIG. 4, aircraft 405 may create a WiFi network at first position 410 to communicate with a controller. However, aircraft detection device 120 may not identify aircraft 405 at first position 410 via first detection channel 110-1 because the controller cannot (e.g., lacks cellular network connectivity) or may not be configured to provide identifying information to aircraft detection device 120, and no other aircraft identification devices may be in range. The WiFi network created by aircraft 405 may not be detected until a second time when aircraft 405 flies to second position 420. At second position 420, another device may be in range of the WiFi network created by aircraft 405, may identify aircraft via the WiFi network created by aircraft 405, and may provide first set of identifying information 430 about aircraft 405 to aircraft detection device 120. Accordingly, first detection channel 110-1 may identify aircraft 405 with a first delay or latency associated with receiving first set of identifying information 430.

Identifying aircraft 405 via third detection channel 110-3 may incur different second delay or latency based on when aircraft 405 broadcasts a message (e.g., an ADS-B message) associated with third detection channel 110-3 or when the broadcast message is detected by a device that is communicably coupled to aircraft detection device 120. For instance, aircraft 405 may broadcast the identifier at positions 440 or 450 upon reaching a certain altitude or after a certain duration of flight time. The message may be broadcast using one or more radio frequencies, and may be received by a broadcast receiver that listens to those radio frequencies. In response to receiving the broadcast message, the broadcast receiver may provide second set of identifying information 460 about aircraft 405 to aircraft detection device 120.

Aircraft detection device 120 may identify aircraft 405, may assign an identifier to aircraft 405, and may notify users as to the presence and location of aircraft 405 upon whichever of first set of identifying information 430 or second set of identifying information 460 is received first. Aircraft detection device 120 may determine that the later arriving set of identifying information is directed to aircraft 405 that has already been identified based on the earlier arriving set of identifying information. Accordingly, aircraft detection device 120 may ignore or discard the later arriving set of identifying information. In some embodiments, aircraft detection device 120 may use the later arriving set of identifying information to update or supplement the previously received set of identifying information for aircraft 405. For instance, aircraft detection device 120 may notify a user about a first location of aircraft 405 based on first receiving second set of identifying information 460 via third detection channel 110-3, and may update the user as to a second location of aircraft 405 based on subsequently receiving first set of identifying information 430 via first detection channel 110-1.

In some cases, the time difference for identifying aircraft 310 using different detection channels 110 may be milliseconds up to several minutes. The delays may vary as aircraft detection device 120 may be unable to identify aircraft 310 using certain detection channels 110 until aircraft 310 flies to a certain location, comes within range of a detecting device or sensor, or satisfies other criteria of a detection channel 110. The multi-channel remote identification may negate the delay by identifying aircraft 310 based on the detection channel 110 that identifies aircraft 310 the fastest.

Figure 5:
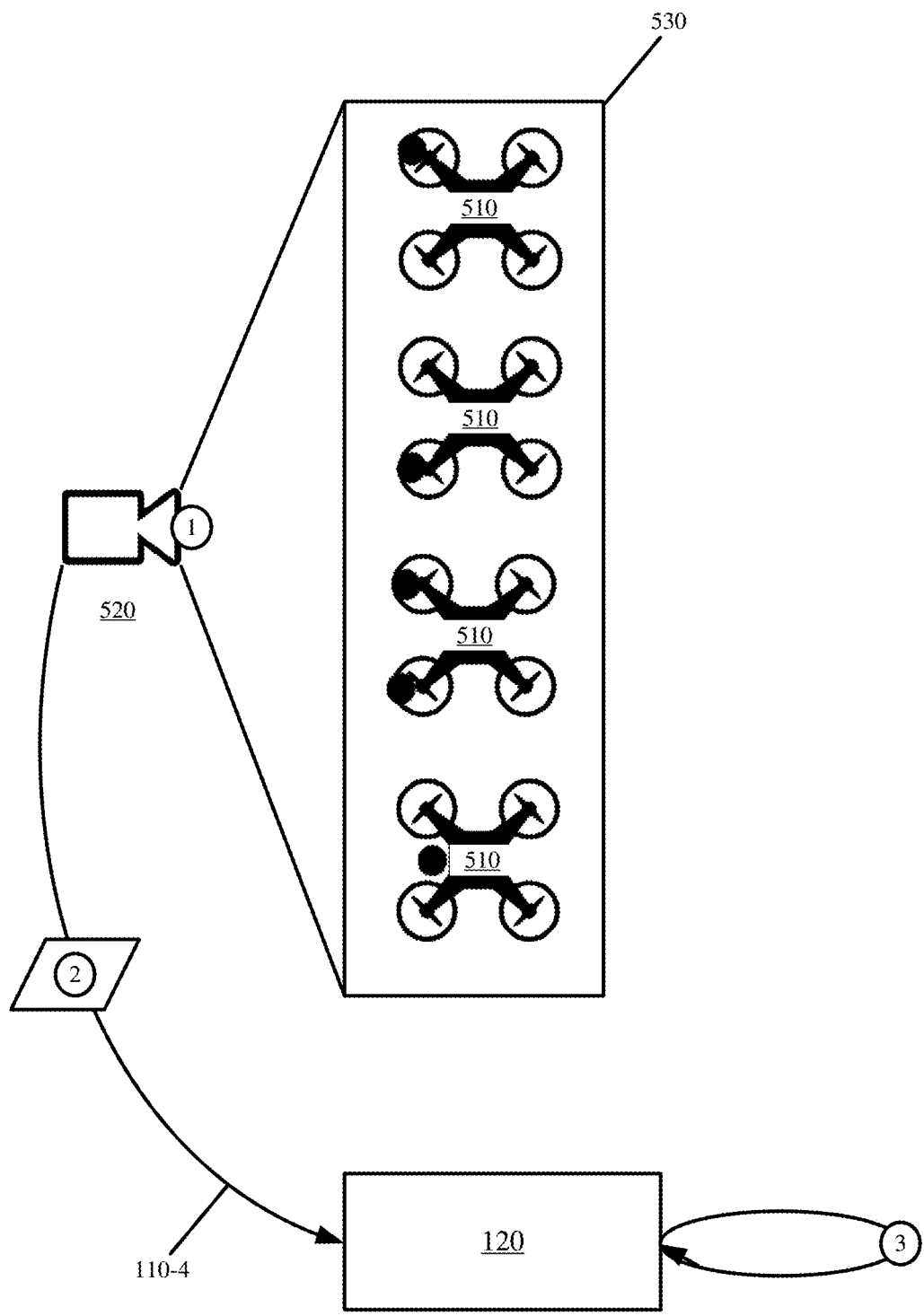
FIG. 5 illustrates an example of using a particular detection channel to identify aircraft when other detection channels may be unable to identify the aircraft or may later identify the aircraft in accordance with some embodiments.

FIG. 5 illustrates an example of using fourth detection channel 110-4 to identify aircraft 510 when other detection channels 110 may be unable to identify aircraft 510 or may identify aircraft 510 at a later time in accordance with some embodiments. For instance, aircraft 510 may fly in response to proprietary or encrypted messaging that is exchanged over a private network established between aircraft 510 and a controller. Aircraft 510 and the associated controller may lack other network connectivity such that aircraft 510 cannot be identified via any of the wireless networks of first detection channel 110-1, and cannot be detected via data relayed by the controller over second detection channel 110-2. Aircraft 510 may also lack a radio transmitter for broadcasting identifiers over a radio frequency of third detection channel 110-3, and may fly at an altitude or in airspace that is not monitored by other detection channels 110.

Aircraft detection device 120 may identify aircraft 510 using fourth detection channel 110-4 based on camera 520 that is within visual range of aircraft 510. As shown in FIG. 5, camera 520 may record (at 1) light signature 530 of aircraft 510. Light signature 530 may be defined by flashing different lights from different locations on aircraft 510, with different intensities, with different colors, for different durations, and/or in different patterns. Light signature 530 may be preferred to other visual features (e.g., shape, size, etc.) of aircraft 510 because light signature 530 may be detected from greater distances than other visual features of aircraft 510. Moreover, light signature 530 may encode an identifier that identifies aircraft 510, may encode additional identifying information, or may provide some manner of differentiating aircraft 510 from other aircraft. For instance, by flashing different lights from different locations on aircraft 510, with different intensities, with different colors, for different durations, and/or in different patterns, aircraft 510 may identify its make, model, and/or other information.

Camera 520 may provide (at 2) identifying information about aircraft 510 to aircraft detection device 120 based on light signature 530. Aircraft detection device 120 may identify aircraft 510 by decoding light signature 530 or otherwise correlating light signature 530 to aircraft 510.

Aircraft detection device 120 may assign (at 3) an identifier to aircraft 510 based on light signature 530, identifying information decoded from or otherwise obtained from light signature 530, and/or other information about aircraft 510 that is obtained by camera 520. For instance, camera 520 may capture a flight pattern of aircraft 510, an image of aircraft 510, and/or other visual features of aircraft 510 that can further aid aircraft detection device 120 in the identification of aircraft 510.

Camera 520 may be part of a device or sensor (e.g., a smartphone, laptop computer, connected camera, etc.) with cellular or long-range network connectivity and a geolocation or geopositional sensor (e.g., a GPS module). Camera 520 may determine its position using the geolocation or geopositioning sensor, and may transmit (at 2) the positional data with light signature 530 and/or other aircraft identifying information so that aircraft detection device 120 may obtain a relative position for aircraft 510 based on the position of camera 520. In some embodiments, aircraft detection device 120 may adjust the position of aircraft 510 relative to the position of camera 520 based on a distance of aircraft 510 from camera 520 that can be computed based on the appearance of aircraft 510 in images taken by camera 520. For instance, the distance between the aircraft and the device may be computed based on the size, brightness, refraction, and/or other properties of the aircraft or light captured from the aircraft, or based on movement of the observed visual characteristics relative to the device.

In some embodiments, the same device or sensor that provides aircraft detection device 120 with aircraft identifying information via one detection channel 110, may also provide additional aircraft identifying information for the same aircraft via one or more other detection channels 110. For instance, camera 520 in FIG. 5 may be part of a user mobile device (e.g., smartphone) that also has multiple wireless network radios.

The user mobile device may obtain a first set of identifying information about aircraft 510 via fourth detection channel 110-1 using camera 520, and may obtain a different second set of identifying information about aircraft 510 via first detection channel 110-1 using the one or more wireless network radios. In particular, the user mobile device may use the wireless network radios to detect a wireless network identifier that is transmitted by aircraft 510 and that identifies aircraft 510. Additionally, the user mobile device may use the wireless network radios to connect to aircraft 510 in order to retrieve additional identifying information based on messaging exchanged with aircraft 510. The user mobile device may provide the first set of identifying information via first detection channel 110-1 and the second set of identifying information via second detection channel 110-2 to aircraft detection device 120 at the same time or at different times.

Aircraft detection device 120 may receive the first and second sets of identifying information, and may determine that the different sets of identifying information identify the same aircraft. The determination may be based on receiving the different sets of identifying information from the same device at or near the same time, and/or based on commonality in the different sets of identifying information (e.g., information about aircraft that is of similar size, flies in the same airspace, is at a common location, etc.). Accordingly, aircraft detection device 120 may generate a single identifier for aircraft 510 that is identified via two or more detection channels 110.

Figure 6:
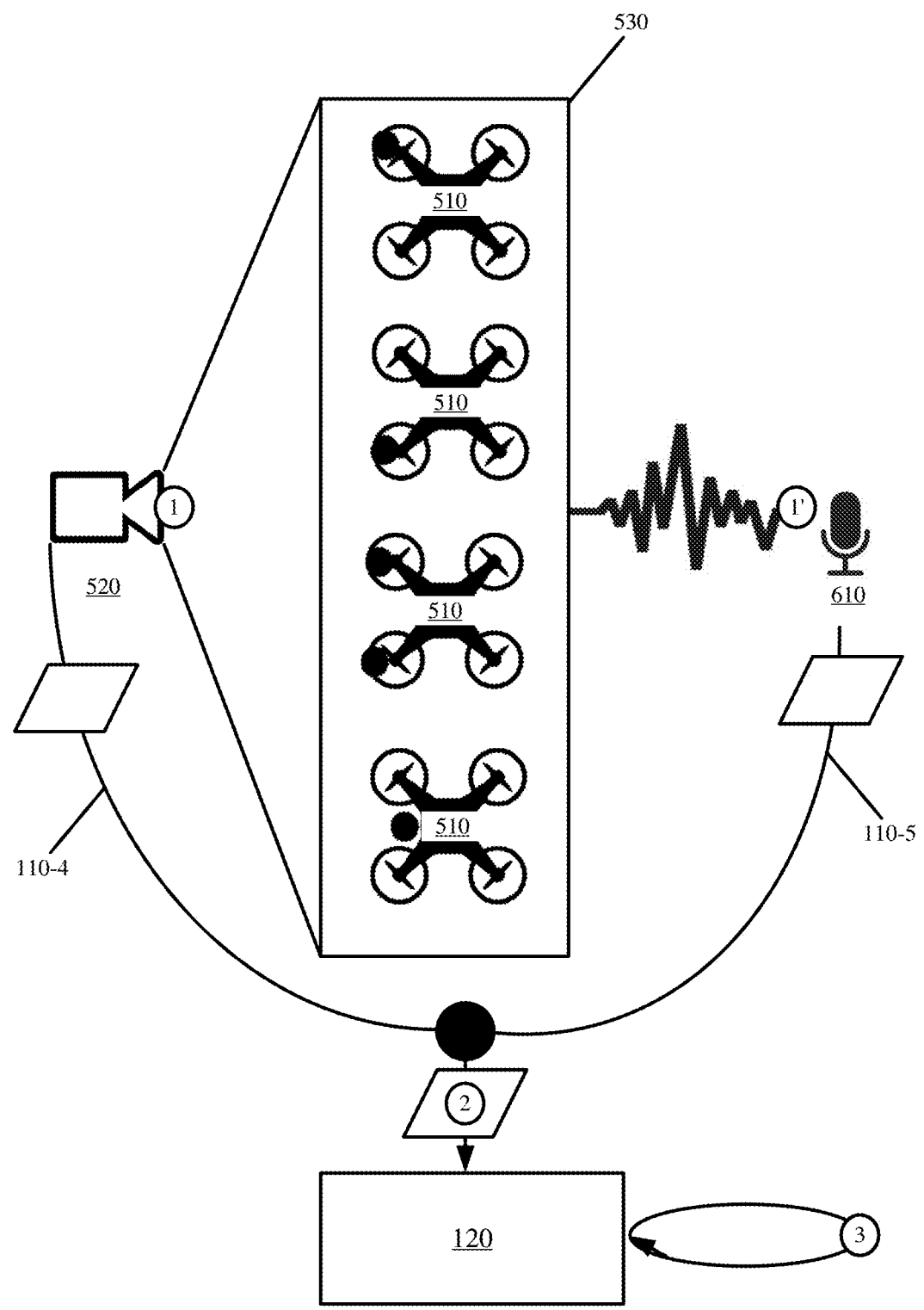
FIG. 6 illustrates an example of using different sensors to provide identifying information about aircraft via two different detection channels in accordance with some embodiments.

FIG. 6 illustrates an example of using different sensors to provide identifying information about aircraft 510 via two different detection channels 110 in accordance with some embodiments. FIG. 6 may continue from FIG. 5, and illustrates camera 520 obtaining (at 1) a first set of identifying information based on light signature 530 of aircraft 510, and microphone 610 within audible range of aircraft 510 capturing (at 1') a second set of identifying information based on the sound signature of aircraft 610. The sound signature may include sound produced by aircraft 610 during flight. Different engines of different aircraft can produce different sound signatures. In some embodiments, the aircraft may be equipped with speakers that emit ultrasonic sound or other sound to encode or otherwise transmit identifying information about the aircraft.

Camera 520 and microphone 610 may be integrated on a single device such that the first and second sets of identifying information are combined before being transmitted (at 2) to aircraft detection device 120. In some embodiments, camera 520 and microphone 610 may be part of different devices, each having cellular or long-range wireless network connectivity for separately communicating, to aircraft detection device 120, the first set of identifying information via fourth detection channel 110-4, and the second set of identifying information via fifth detection channel 110-5.

Aircraft detection device 120 may receive (at 2) the combined set of identifying information, and may identify aircraft 510 based on one or more of light signature 530 and the sound signature of aircraft 510. For instance, aircraft detection device 120 may identify aircraft 610 based on properties or characteristics of the sound. Some examples of sound properties or characteristics that may be used to identify aircraft 610 are frequency, volume, pitch, tone, and period. From these sound properties or characteristics, aircraft detection device 120 may determine the number, size, speed, and/or rotation of propellers or other engines used by aircraft 610 in order to identify aircraft 610 (e.g., aircraft 610 size, category, class, type, make, model, maximum speed, airspace class, piloted or unpiloted, etc.). As noted above, aircraft 610 may also use a speaker to generate a unique sound signature that identifies aircraft 610. In this case, the sound frequency, volume, pitch, tone, and period can be manipulated to encode aircraft identifying information. The sound may also be used to adjust the relative position of aircraft 610 as determined from the geolocation or geopositional module of the device transmitting the identifying information. Aircraft detection device 120 may assign (at 3) an identifier to aircraft 610 based on the identifying information provided via fourth detection channel 110-4 and fifth detection channel 110-5.

Figure 7:
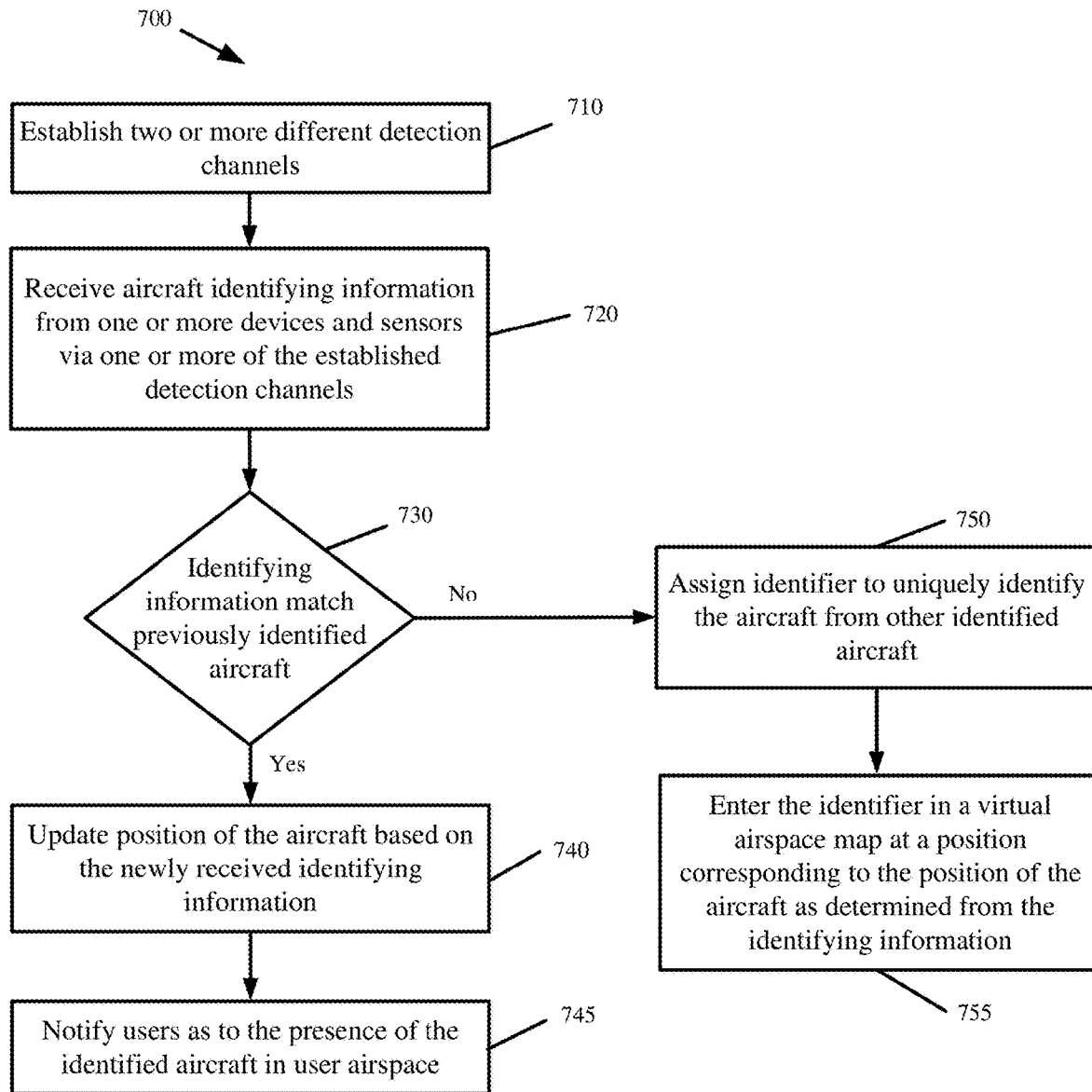
FIG. 7 presents a process for the multi-channel remote identification of aircraft in accordance with some embodiments presented herein.

FIG. 7 presents a process 700 for the multi-channel remote identification of aircraft in accordance with some embodiments presented herein. Process 700 may be performed by aircraft detection system 100 in a distributed manner by aircraft detection device 120 and a distributed set of devices and sensors.

Process 700 may include establishing (at 710) detection channels 110 for identifying different aircraft in different airspace. Establishing (at 710) detection channels 110 may include connecting aircraft detection device 120 to the distributed set of devices and sensors that operate throughout the airspace.

Process 700 may include receiving (at 720) aircraft identifying information from one or more of the distributed set of devices and sensors via one or more detection channels 110. The identifying information can include captured network messages, radio frequencies, network/wireless signaling, broadcast messages, visual features, light signatures, sound signatures, and/or sensor obtained information that is sent to or issued by aircraft. The identifying information may directly or indirectly identify aircraft. In some embodiments, the direct identification of the aircraft may include obtaining a make, model, and/or other specific information about the aircraft directly from the data obtained via the different detection channels 110. For instance, the network messages, broadcast messages, light signatures, sound signatures, etc. may encode or may otherwise provide the make, model, and/or other aircraft identifying information. In some embodiments, the indirect identification may include using the visual features, sound, network identifiers, and/or other data to determine the specifications of the aircraft. For instance, the sound may correspond to aircraft with engines or motors of a certain size, type, and/or other characteristics from which aircraft identifying information can be detected. The identifying information may further include positional information for the aircraft. As noted above, the positional information may be generated and/or obtained from a geolocation or geopositional sensor on the aircraft, may be embedded in the sensed data, or may be based on the positional information from one of the distributed set of devices or sensors that provides the identifying information about aircraft.

Process 700 may include determining (at 730) if the identifying information matches to previously identified aircraft. For instance, aircraft detection device 120 may determine if the received (at 720) identifying information is provided over different detection channels 110, and the identifying information is provided by a common device or sensor, identifies the same aircraft, and/or is related to the same position or airspace.

In response to determining (at 730—Yes) that the identifying information matches and/or identifies a previously identified aircraft, process 700 may include supplementing the identification of the aircraft with the newly received identifying information or discarding the newly received identifying information. Supplementing the identification of the aircraft may include updating (at 740) a position of the aircraft based on the newly received identifying information, and/or notifying (at 745) one or more users, that operate in the airspace around the position indicated by the identifying information, as to the presence of the identified aircraft. For instance, aircraft detection device 120 may notify the one or more users that the previously identified aircraft remains active in the airspace and/or has moved to the updated position.

In response to determining (at 730—No) that the identifying information does not match or identify a previously identified aircraft, process 700 may include assigning (at 750) a new identifier to uniquely identify the aircraft from other identified aircraft. The identifier may provide various information about the aircraft. For instance, and with reference to FIG. 2 above, the identifier may reveal the type of aircraft, the class of airspace that aircraft operates in, and/or characteristics of the aircraft, flight operator, flight plan, or flight purpose. Alternatively, aircraft detection device 120 may link the identifying information to the identifier so that the information can be graphically or programmatically accessed using the identifier.

Process 700 may include entering (at 755) the identifier in a virtual airspace map at a position corresponding to the relative or exact position of the aircraft as determined from the identifying information. The virtual airspace map may further include the identifiers for other identified aircraft. Each identifier may have a position or location in the virtual airspace map that corresponds to a last tracked or identified actual position or actual location for the aircraft identified by that identifier.

Figure 8:
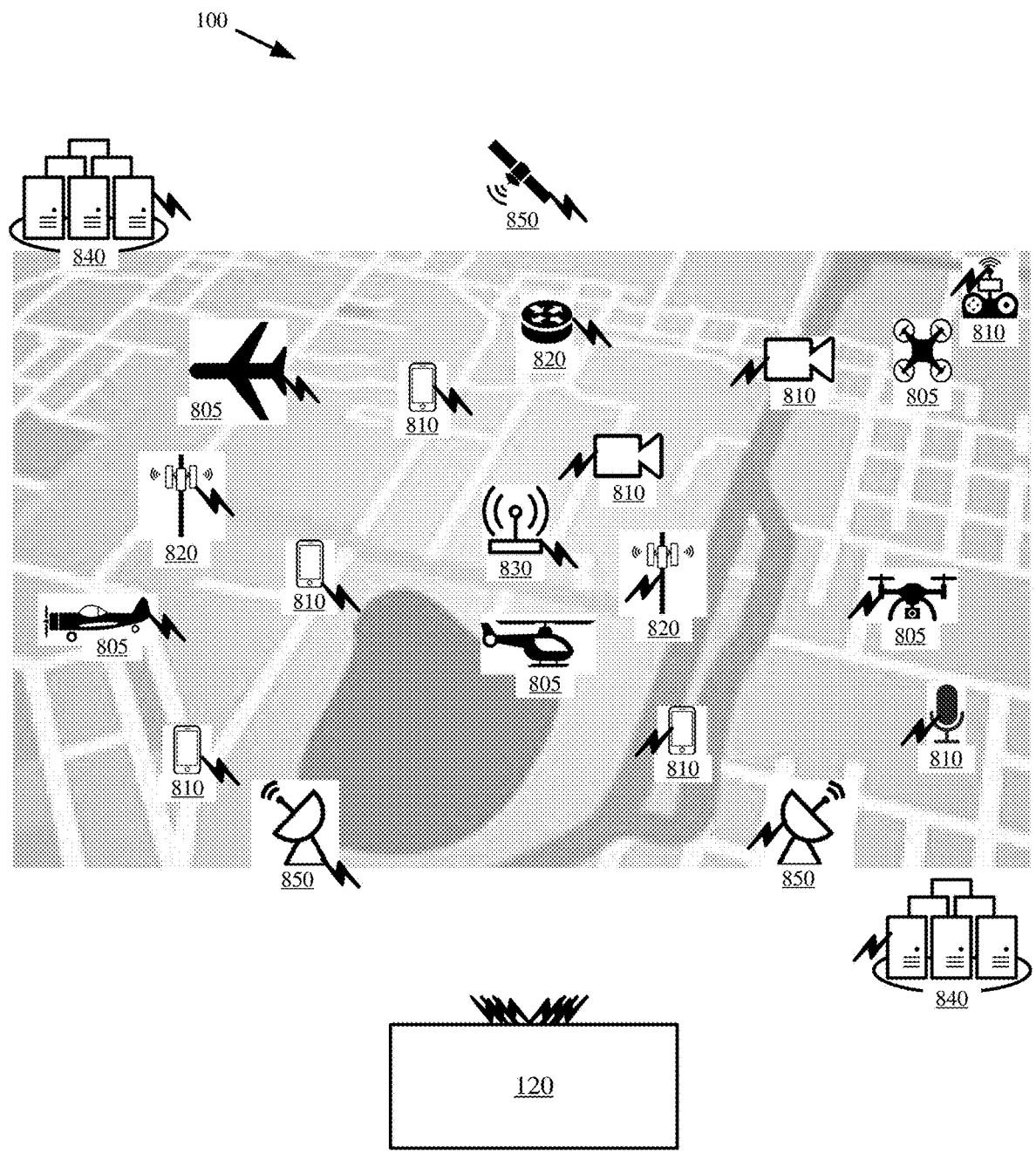
FIG. 8 illustrates the airspace detection system in accordance with some embodiments described herein.

FIG. 8 illustrates airspace detection system 100 in accordance with some embodiments described herein. As shown in FIG. 8, airspace detection system 100 may include aircraft detection device 120 and a distributed set of devices and sensors that form the different detection channels 110 by which airspace detection system 100 may identify different types of aircraft 805 operating in different airspace.

Airspace detection system 100, by virtue of the multi-channel remote identification and integration of the distributed set of devices and sensors, can adapt to identify and/or track almost any kind of aerial vehicle. For instance, aircraft 805 may include different makes and models of aircraft from different manufacturers with one or more propellers, jet engines, and/or other means of flight. Aircraft 805 may include one or more sensors of the distributed set of devices and sensors. The sensors may be used to obtain various identifying information directly from aircraft 805. Aircraft 805 may further include one or more wireless radios to communicate with remote controllers, air control systems, and/or other devices.

The distributed set of devices and sensors may include user equipment ("UEs") 810, network equipment 820, broadcast receivers 830, aircraft control cloud system 840, and/or flight tracking equipment 850. Aircraft detection device 120 may be communicably coupled to each of the distributed set of devices and sensors, and may receive identifying information from each of the distributed set of devices and sensors via one or more data networks.

In some embodiments, UEs 810 may include devices that can capture and convey identifying information via first, second, third, fourth, and fifth detection channels 110. UEs 810 may include computation and communication devices, such as wireless mobile communication devices with one or more wireless network radios (operating on different frequencies or with different signaling) and/or integrated sensors such as cameras and microphones. For instance, a UE 810 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a remote controller for flying aircraft 805; a camera; a sound recorder; an Internet-of-Things ("IoT") device; or another type of mobile computation and communication device. UEs 810 may be portable devices that can be carried by users for flight control or purposes unrelated to flight. Accordingly, airspace detection system 100 may leverage almost any network-enabled device to identify aircraft 805 via one or more detection channels 110.

Network equipment 820 may include base stations, routers, RANs, MEC devices, servers, and/or other devices that are distributed throughout a network and that can provide aircraft identifying information to aircraft detection devices 120 based on data packets passing through a network. Network equipment 820 may further include network components that register aircraft 805 and other devices in order to provide access to the network.

Broadcast receivers 830 may include devices that are tuned to various radio frequencies in order to receive broadcast message or identifiers from aircraft 805. Broadcast receivers 830 may be special-purposed devices that are distributed throughout airspace. Broadcast receivers 830 may also include one or more UEs 810 that have the proper radios or sensors to receive the broadcast messages.

Aircraft control cloud system 840 may include one or more cloud-based systems that track and/or control flights of a set of aircraft 805 remotely from within a network (e.g., a cellular network). Cloud-based systems may also access aircraft detection system 100 to assist users in creating a non-conflicting and authorized flight plan.

Flight tracking equipment 850 may include radar, satellite, and/or other equipment used by air traffic controllers to identify and track commercial aircraft. Flight tracking equipment 850 may be restricted to a single detection channel that is unable to detect smaller aircraft such as drones, UAVs, personal transportation aerial vehicles, etc.

Aircraft detection device 120 may be implemented and/or executed by dedicated and/or shared computing machines of airspace detection system 100. For instance, aircraft detection device 120 may be a network-enabled server that identifies and tracks aircraft 805 based on identifying information obtained from the distributed set of devices and sensors via different detection channels 110.

The quantity of devices and/or sensors, illustrated in FIG. 8, is provided for explanatory purposes only. In practice, airspace detection system 100 may include additional devices and/or sensors; fewer devices and/or sensors; different devices and/or sensors; or differently distributed devices and/or sensors than illustrated in FIG. 8. Devices and sensors of airspace detection system 100 may interconnect with each other and/or other devices via wired connections, wireless connections, or a combination of wired and wireless connections.

As per the embodiments above, aircraft detection system 100 may identify a particular aircraft based on identifying information from whichever detection channel 110 first detects that particular aircraft. In some embodiments, aircraft detection system 100 may supplement the identifying information of the particular aircraft with other identifying information that aircraft detection system 100 compiles from other detection channel 110 and/or other devices, sensors, or systems providing the other identifying information for the particular aircraft.

The different sets of identifying information that are compiled for different detected aircraft from different detection channel 110 and/or from multiple devices, sensors, or systems provide aircraft detection system 100 with a more comprehensive and detailed profile of each detected aircraft. The comprehensive profiles enable more accurate and enhanced monitoring, tracking, reporting, and/or other functionality that would otherwise not be impossible when relying on identifying information from a single detection channel 110.

Figure 9:
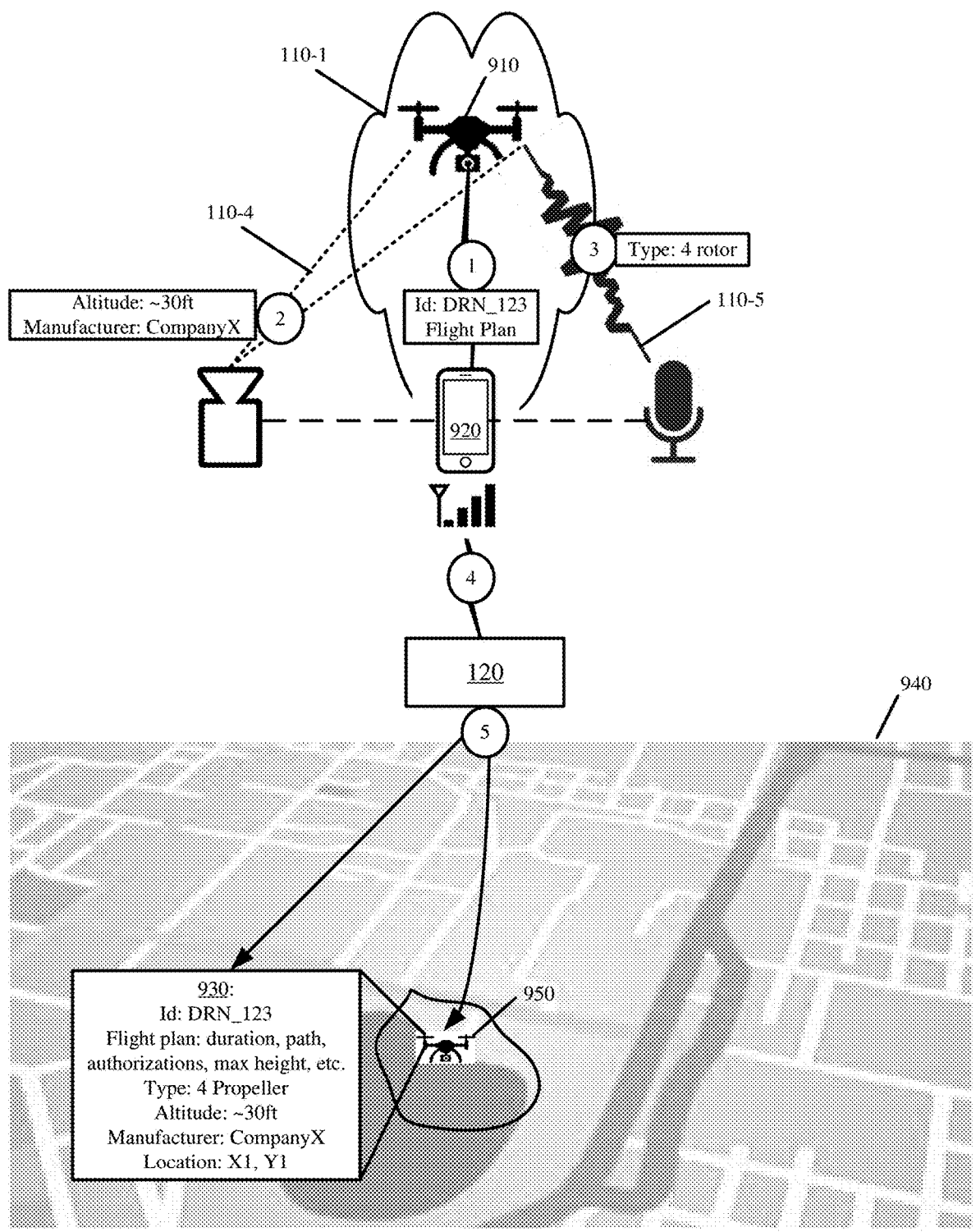
FIG. 9 illustrates an example of the aircraft detection device generating a profile for aircraft based on identifying information that the aircraft detection device compiles from different detection channels in accordance with some embodiments described herein.

FIG. 9 illustrates an example of aircraft detection device 120 generating a profile for identified aircraft based on identifying information that aircraft detection device 120 compiles from different detection channel 110 in accordance with some embodiments described herein. In FIG. 9, aircraft detection device 120 generates a profile for aircraft 910 based on different identifying information that is collected via first detection channel 110-1, fourth detection channel 110-4, and fifth detection channel 110-5.

The identifying information collected from first detection channel 110-1 may include an identifier that aircraft 910 wirelessly broadcasts (at 1) or otherwise transmits over a first wireless network as well as information about the flight plan of aircraft 910. UE 920, via a first sensor or network radio, may wirelessly receive (at 1) the identifier, the flight plan, and/or other information about aircraft 910 that is included with the broadcast messages and/or other signaling or messaging passed over the first wireless network.

The identifying information collected from fourth detection channel 110-4 may include one or more images of aircraft 910 obtained (at 2) using a camera of UE 920. The images may capture an encoded message that aircraft 910 conveys via flashing different lights with different color at different durations and/or intensities. From these images, aircraft detection device 120 may determine various additional identifying information that may not be included or may not be obtained from the identifying information detected via first detection channel 110-1 or other detection channel 110. For instance, in FIG. 9, aircraft detection device 120 may determine the altitude at which aircraft 910 flies and the manufacturer of aircraft 910.

The identifying information collected from fifth detection channel 110-5 may include the sound signature or sound that is emitted by aircraft 910 during flight. UE 920 may obtain (at 3) the sound signature or source using a microphone. From the sound signature, aircraft detection device 120 may determine additional identifying information that may not be included or may not be obtained from the identifying information detected via first detection channel 110-1, fourth detection channel 110-4, or other detection channel 110. For instance, aircraft detection device 120 may detect the number of propellers or the type of aircraft from the sound signature.

UE 920 may provide (at 4) the different sets of identifying information, that are collected from different detection channel 110-1, 110-4, and 110-5, to aircraft detection device 120 via a different second wireless network. UE 920 may provide the identifying information from each detection channel 110-1, 110-4, and 110-5 to aircraft detection device 120 at the same time, or at different times as the identifying information is collected on the different detection channel 110-1, 110-4, and 110-5.

In some embodiments, UE 920 may supplement each set of identifying information with location data corresponding to a location of UE 920 or a detected location of aircraft 910. The location data may include coordinates or other positional information obtained from a positional sensor (e.g., a GPS module) of UE 920.

Aircraft detection device 120 may process the images, sounds, and/or other data provided (at 4) by UE 920 in order to extract the identifying information that is collected from different detection channel 110-1, 110-4, and 110-5. Aircraft detection device 120 may compile the identifying information into single profile 930 that is generated for aircraft 910, and that is used to identify and track aircraft 910 during flight. Profile 930 may store the various identifying information about aircraft 910 that is obtained from detection channel 110-1, 120-4, and 120-5, and may therefore provide a more comprehensive identification of aircraft 910 than when using the identifying information that can be collected from a single detection channel 110.

Aircraft detection device 120 may also use the compiled identifying information and profile to more accurately identify aircraft 910 within dynamic airspace map 940. Users may visually or programmatically access dynamic airspace map 940 in order to obtain information about active flights in different regions of airspace. For instance, aircraft detection device 120 may use the identifying information from profile 930, and more specifically, the aircraft identifier and flight plan obtained from first detection channel 110-1, the altitude and manufacturer identifying information obtained from fourth detection channel 110-4, and the four-propeller aircraft identifying information obtained from fifth detection channel 110-5 to select user interface ("UI") element 950 with which to accurately represent aircraft 910 and show an authorized flight path of aircraft 910 in dynamic airspace map 940. UI element 950 may be displayed at a location corresponding to the location at which UE 920 identified aircraft 910.

In some embodiments, aircraft detection device 120 may update profile 930 as more identifying information is received about aircraft 910 via detection channel 110. The additional identifying information for profile 930 may be provided by UE 920 or any other UEs, network equipment, broadcast receivers, aircraft control cloud system, flight tracking equipment, and/or other sensors and systems that may integrate with airspace detection system 100.

In FIG. 9, a single device, UE 920, provides the identifying information from different detection channel 110-1, 110-4, and 110-5 to aircraft detection device 120. In this case, aircraft detection device 120 may determine that the different sets of identifying information provided by UE 920 are identifying information for the same aircraft 910, especially when the different sets of identifying information are provided by the same device (e.g., UE 920) at the same time or within a short period of time (e.g., within one minute).

In some embodiments, UE 920 may tag each set of identifying information for aircraft 910 that is collected from a different detection channel 110 with a common identifier prior to providing that set of identifying information to aircraft detection device 120. Aircraft detection device 120 may use the tagged common identifier to determine which sets of identifying information pertain to which aircraft 910 or which profile 930.

For instance, and with reference to FIG. 9, UE 920 may detect aircraft 910 based on a first set of identifying information that is first received from first detection channel 110-1. Accordingly, UE 920 may generate a new identifier to identify aircraft 910, and may tag the first set of identifying information with the identifier. Subsequently, UE 920 may obtain second and third sets of identifying information from fourth and fifth detection channel 110-4 and 110-5, and may determine that the second and third sets of identifying information supplement the identification of aircraft 910. Accordingly, UE 920 may tag the second and third sets of identifying information with the same identifier that was used to tag the first set of identifying information. UE 920 may send the different sets of tagged identifying information to aircraft detection device 120 at different times. Aircraft detection device 120 may enter the different set of tagged identifying information to the same profile (e.g., profile 930) based on the common identifier that indicates each of the different sets of identifying information as pertaining to the same aircraft (e.g., aircraft 910).

Figure 10:
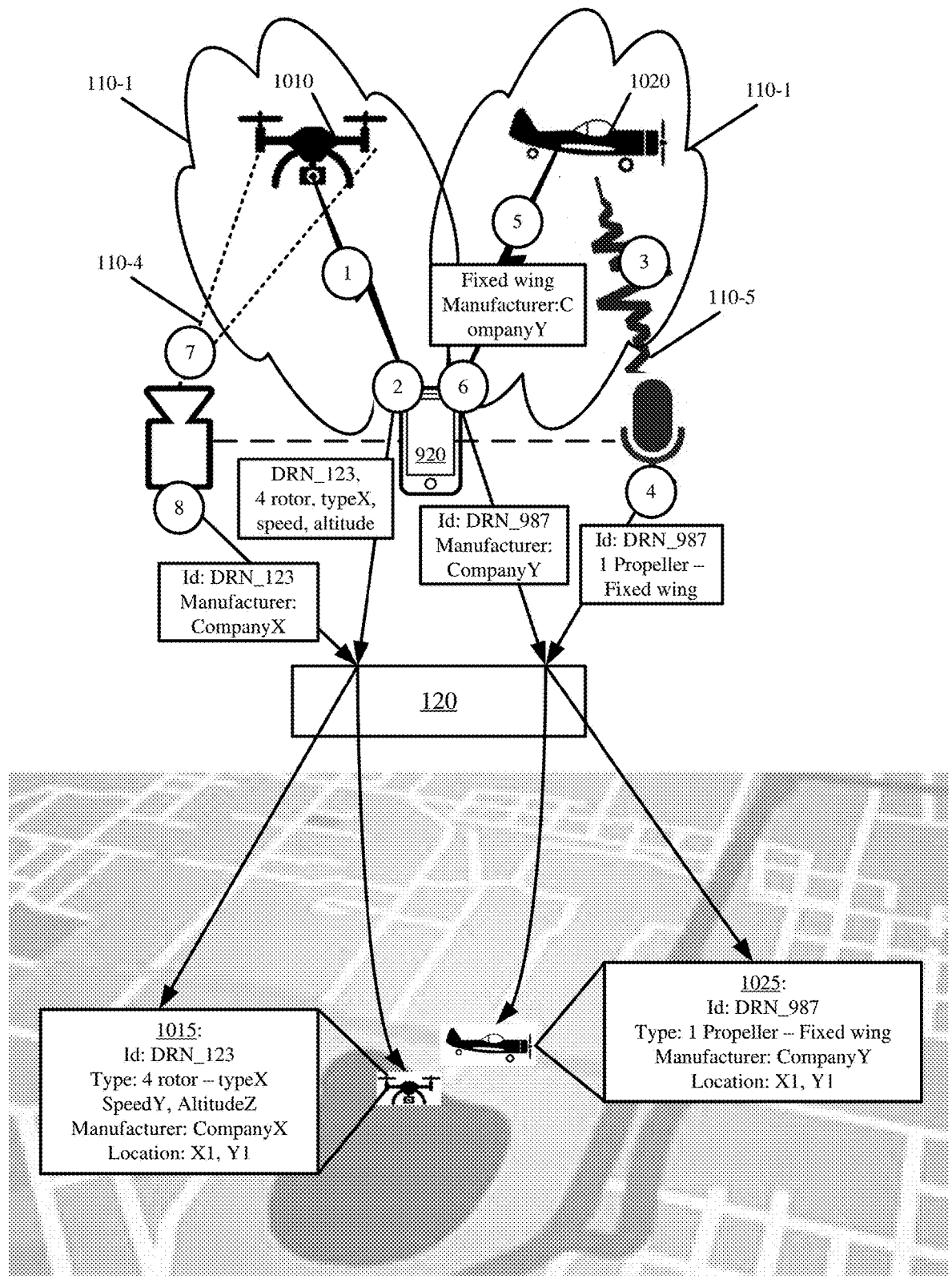
FIG. 10 illustrates an example of using different tags to differentiate the identifying information for different aircraft in accordance with some embodiments described herein.

FIG. 10 illustrates an example of using different tags to differentiate the identifying information for different aircraft in accordance with some embodiments described herein. As shown in FIG. 10, UE 920 detects (at 1) first aircraft 1010 over first detection channel 110-1, and provides (at 2) a first identifier for first aircraft 1010 along with a first set of identifying information that is obtained via first detection channel 110-1 to aircraft detection device 120. For instance, the first identifier and/or the first set of identifying information may identify first aircraft 1010 as a multi-rotor aerial vehicle of a first type or size, and may further identify a speed and altitude of first aircraft 1010.

UE 920 later detects (at 3) a second set of identifying information for second aircraft 1020 over fifth detection channel 110-5 based on a sound signature of second aircraft 1020. The sound signature captured via the microphone of UE 920 may not match to an expected sound signature of first aircraft 1010 (e.g., a multi-rotor aerial vehicle). For instance, the sound signature may correspond to the sound that is made by a single-propeller fixed-wing aircraft that is of a different second type or larger size than the first aircraft 1010 (e.g., multi-rotor aerial vehicle). Accordingly, UE 920 may generate a different second identifier for second aircraft 1020, and may provide (at 4) the second identifier and the second set of identifying information for second aircraft 1020 to aircraft detection device 120.

UE 920 may obtain (at 5) a third set of identifying information for second aircraft 1020 over first detection channel 110-1 in response to second aircraft 1020 providing wireless messaging or a wireless identifier that differs from the wireless messaging or the wireless identifier transmitted by first aircraft 1010. UE 920 may determine that the second set of identifying information relates to second aircraft 1020 based on one or more elements of the third set of identifying information match to one or more elements of the second set of identifying information that was obtained (at 3) for second aircraft 1020 via fifth detection channel 110-5. For instance, the third set of identifying information may identify a type of aircraft that matches the aircraft type identified from the second set of identifying information. Accordingly, UE 920 may tag the third set of identifying information with the second identifier, and may provide (at 6) the third set of identifying information with the second identifier to aircraft detection device 120.

In response to receiving the second and third sets of identifying information with the same second identifier, aircraft detection device 120 may determine that these different set of identifying information pertain to the same aircraft (e.g., aircraft 1020). Accordingly, aircraft detection device 120 may enter the second and third sets of identifying information with the same second identifier in profile 1025 that is generated for second aircraft 1020, thereby supplementing the second set of identifying information obtained from fifth detection channel 110-5 with the third set of identifying information obtained from first detection channel 110-1.

UE 920 may also obtain (at 7) a fourth set of identifying information for first aircraft 1010 over fourth detection channel 110-4 in response to first aircraft 1010 coming within visual range of UE 920. UE 920 may determine that one or more elements from the fourth set of identifying information match to one or more elements of the first set of identifying information that was obtained (at 1) for first aircraft 1010 from first detection channel 110-1. Accordingly, UE 920 may tag the fourth set of identifying information with the first identifier (that was also used to tag the first set of identifying information), and may provide (at 8) the fourth set of identifying information with the first identifier to aircraft detection device 120.

In response to receiving the first and fourth sets of identifying information with the same first identifier, aircraft detection device 120 may determine that these different set of identifying information pertain to the same aircraft (e.g., aircraft 1010). Accordingly, aircraft detection device 120 may enter the first and fourth sets of identifying information with the same first identifier in profile 1015 that is generated for first aircraft 1010, thereby supplementing the first set of identifying information obtained from first detection channel 110-1 with the fourth set of identifying information obtained from fourth detection channel 110-4.

The tagged identifiers simplify the task of matching different sets of identifying information to the same aircraft or profile. However, different devices, sensors, or systems may provide identifying information for the same aircraft to aircraft detection device 120, and each device, sensor, or system may use a different identifier for the identifying information that is detected for the same aircraft. Alternatively, the devices, sensors, or systems may send untagged identifying information to aircraft detection device 120. In some such embodiments, aircraft detection device 120 may analyze the identifying information to determine if the identifying information supplements other identifying information for previously identified aircraft and should be added to the profile of the previously identified aircraft, or if the identifying information is identifying information for new aircraft that has not been previously identified and should be entered in a new profile. In other words, aircraft detection device 120 may match different obtained sets of identifying information that pertain to the same aircraft without a common identifier being tagged to the different sets of identifying information by the sending device, sensor, or system.

Aircraft detection device 120 may determine that newly received set of identifying information supplements identifying information for previously identified aircraft based on one or more of temporal, locational, originator, elemental, and/or other commonality between the newly received and previously received identifying information. In some embodiments, aircraft detection device 120 may produce confidence score based on the amount of commonality that exists between different sets of identifying information. A match of supplemental identifying information for a particular aircraft may be detected when the confidence score exceeds a defined threshold.

In some embodiments, aircraft detection device 120 may generate a first tag to associate a first set of identifying information to a particular aircraft. Aircraft detection device 120 may use the first tag to associate a second set of identifying information to the particular aircraft when the confidence score for matching the second set of identifying information to the particular aircraft based on commonality between the first and second sets of identifying information exceeds the threshold. Associating the first tag to the second set of identifying information may include aircraft detection device 120 adding the second set of identifying information to the profile of the particular aircraft already containing the first set of identifying information, and/or updating the dynamic airspace map to account for and/or include the second set of identifying information in the identification of the particular aircraft therein. If there is insufficient commonality between the second set of identifying information and the first set of identifying information or other previously received identifying information for other detected aircraft, then aircraft detection device 120 may associate the second set of identifying information with a newly generated second identifier.

The temporal commonality may include determining that a first set of identifying information, that is provided by a first device or obtained from one detection channel, matches to and/or supplements a second set of identifying information, that is provided by a second device or that is obtained from another detection channel, based on the different sets of identifying information being obtained within a threshold amount of time of one another. For instance, the temporal commonality may increase the confidence score for newly received first set of identifying information by a first amount in response to aircraft detection device 120 receiving the first set of identifying information within 5 seconds of a second of identifying information, and may increase the confidence score by a lesser second amount in response to aircraft detection device 120 receiving the first and second sets of identifying information within 30 seconds of one another.

The locational commonality may include determining that a first set of identifying information matches to and/or supplements a second set of identifying information based on the different sets of identifying information originating from a common geographic region or identifying aircraft in a common geographic region. For instance, the locational commonality may increase the confidence score for newly received first set of identifying information by a first amount in response to aircraft detection device 120 receiving the first set of identifying information and a previously received second set of identifying information from two different devices that operate within 100 feet of one another, and may increase the confidence score by a lesser second amount in response to the two devices being separated by more than 100 feet of distance.

The originator commonality may include determining that a first set of identifying information matches to and/or supplements a second set of identifying information based on the different sets of identifying information originating from the same device, sensor, or system. For instance, the originator commonality may increase the confidence score for newly received first set of identifying information by a first amount in response to aircraft detection device 120 receiving the first set of identifying information from the same device, sensor, or system as a previously received second set of identifying information.

The elemental commonality may include determining that a first set of identifying information matches to and/or supplements a second set of identifying information based on the different sets of identifying information including one or more of the same identifying informational elements. For instance, the elemental commonality may increase the confidence score for newly received first set of identifying information by a first amount when 4 different elements match to elements of a previously received second set of identifying information. The matching elements can include the make, model, type, manufacturer, flight duration, altitude, speed, flight path, trajectory, obtained authorizations, and/or any piece of identifying information that can be obtained from different detection channel 110.

Figure 11:
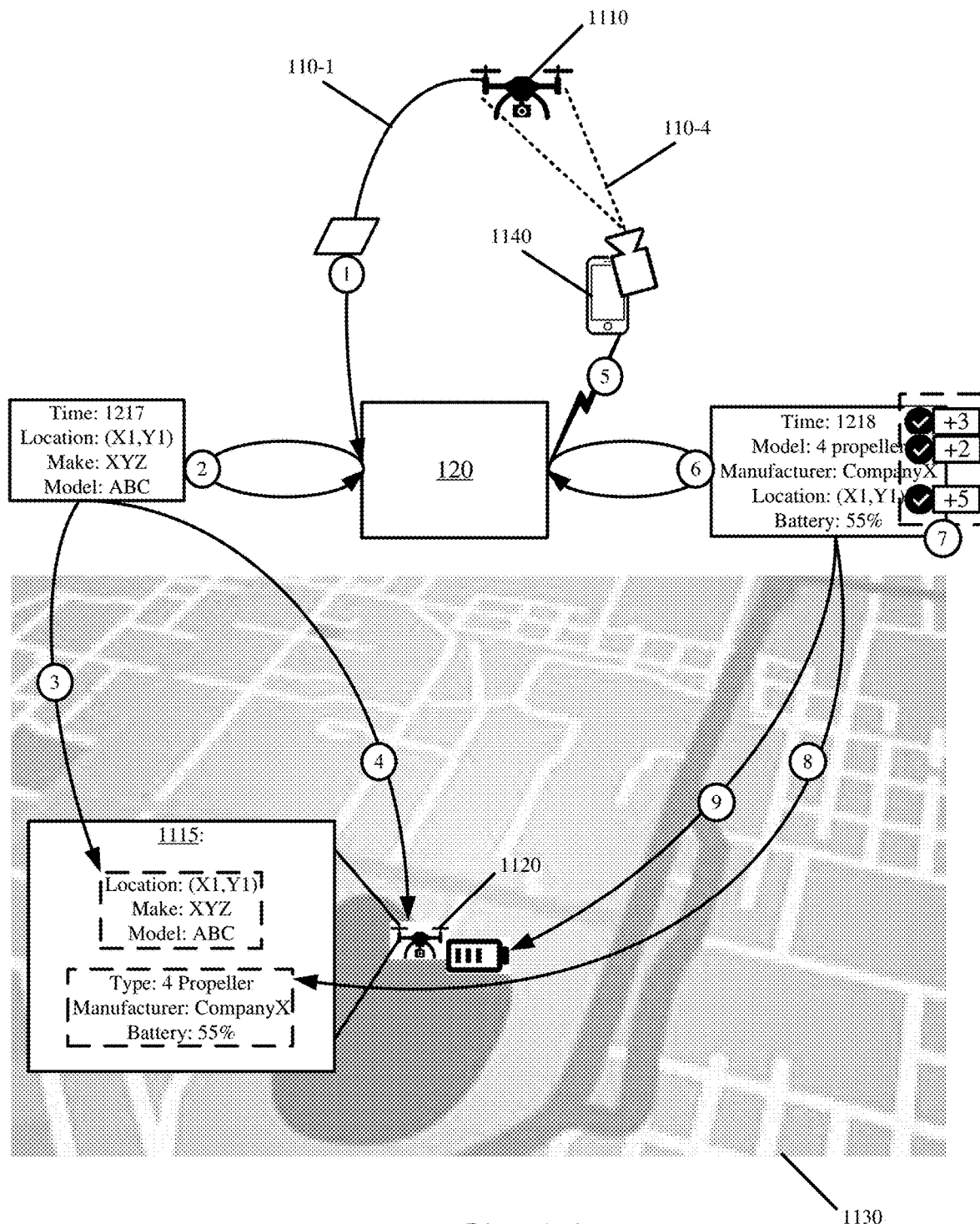
FIG. 11 illustrates an example of the aircraft detection device supplementing a profile for particular aircraft based on detected commonality in different sets of identifying information that are provided by different devices and/or that are obtained from different detection channels in accordance with some embodiments described herein.

FIG. 11 illustrates an example of aircraft detection device 120 supplementing a profile for aircraft 1110 based on detected commonality in different sets of identifying information that are provided by different devices and/or that are obtained from different detection channels in accordance with some embodiments described herein. As shown in FIG. 11, aircraft detection device 120 receives (at 1) a first set of untagged identifying information from aircraft 1110 at a first time via first detection channel 110-1 based on wireless messaging provided by aircraft 1110. The first set of untagged identifying information may include a timestamp corresponding to the time when the identifying information is transmitted by aircraft 1110 or is received by aircraft detection device 120, a location corresponding to a location of aircraft 1110, a make and model of aircraft 1110, and/or other identifying information.

Aircraft detection device 120 may determine (at 2) that the first set of identifying information has no commonality with previously received sets of identifying information, and therefore identifies a new previously undetected aircraft. Accordingly, aircraft detection device 120 may generate profile 1115 for aircraft 1110, may enter (at 3) the first set of identifying information to profile 1115, and may present (at 4) UI element 1120 on dynamic airspace map 1130 based on the first set of identifying information. In some embodiments, entering the identifying information to profile 1115 may include tagging the first set of identifying information with an identifier that is generated for profile 1115 and/or aircraft 1110.

Aircraft detection device 120 receives (at 5) a second set of untagged identifying information from UE 1140 at a second time that is after the first time. UE 1140 may obtain the second set of untagged identifying information using fourth detection channel 110-4 based on one or more images of aircraft 1110 that are captured using a camera or other sensor of UE 1140. The second set of untagged identifying information may include a timestamp corresponding to the time when the second set of identifying information is obtained by UE 1140, a location corresponding to a location of UE 1140, battery status, and/or other identifying information in addition to the images.

Aircraft detection device 120 may process the images in order to extract additional identifying information from the images. Aircraft detection device 120 may compare (at 6) the second set of identifying information to identifying information entered within different profiles of identified aircraft.

From the comparison (at 6), aircraft detection device 120 may detect a first amount of temporal commonality based on the timestamps for the first and second sets of identifying information being within a threshold amount of time of one another. Additionally, aircraft detection device 120 may detect a second amount of locational commonality based on the location provided with the first set of identifying information being within a threshold distance of the location provided with the second set of identifying information. Moreover, aircraft detection device 120 may detect a third amount of elemental commonality based on the make and model identified in the first set of identifying information matching to the type of aircraft that is identified from processing the images of the second set of identifying information. For instance, the make and model may correspond to a four-rotor aerial drone that is detected in the images of the second set of identifying information.

Aircraft detection device 120 may produce (at 7) a confidence score based on the detected commonality, and may determine (at 7) that the first and second sets of identifying information pertain to the same aircraft (e.g., aircraft 1110) based on the confidence exceeding a threshold value. In other words, aircraft detection device 120 may determine (at 7) that the second set of identifying information supplements the first set of identifying information used to identify aircraft 1110. Accordingly, aircraft detection device 120 may enter (at 8) the second set of identifying information to profile 1115, that already stores the first set of identifying information. Aircraft detection device 120 may enter (at 8) the second set of identifying information to profile 1115 by tagging the second set of identifying information with the same identifier that was used to associate the first set of identifying information to profile 1115 and/or aircraft 1110. Aircraft detection device 120 may also update (at 9) UI element 1120 on dynamic airspace map 1130 based on the supplemental information that is found in the second set of identifying information and that was not part of the first set of identifying information. For instance, aircraft detection device 120 may change the icon or graphic used to represent aircraft 1110 in dynamic airspace map 1130 or may add information about flight of aircraft 1110 (e.g., the altitude, trajectory, flight path, flight pattern, etc.) and/or information, such as flight status (e.g., connection status, battery status, engine status, operational status, etc.) that can be decoded from one or more lights of aircraft 1110 flashing in different patterns, different sequences, with different colors, with different intensities, for different durations, and/or other characteristics in the captured images.

Detecting the commonality between different sets of identifying information, that are obtained from different detection channel 110 and/or different devices, sensors, or systems at different times, allows aircraft detection device 120 to compile more information about the identified aircraft than would be available from a single detection channel 110. The compiled information can therefore lead to more accurate and complete identification of the aircraft, continual identification of the aircraft as the aircraft move into and out of range of different detection channel 110, devices, sensors, and/or systems, and continued operation of airspace detection system 100 in the event that any single detection channel 110, device, sensor, or system becomes inaccessible because of a failure, network outage, or other unexpected behavior. Accordingly, the multi-channel remote identification of aircraft and the compilation of identifying information from the different detection channel 110 may enhance the monitoring, tracking, and alerting capabilities of airspace detection system 100 beyond what may be possible with single channel detection systems.

Figure 12A:
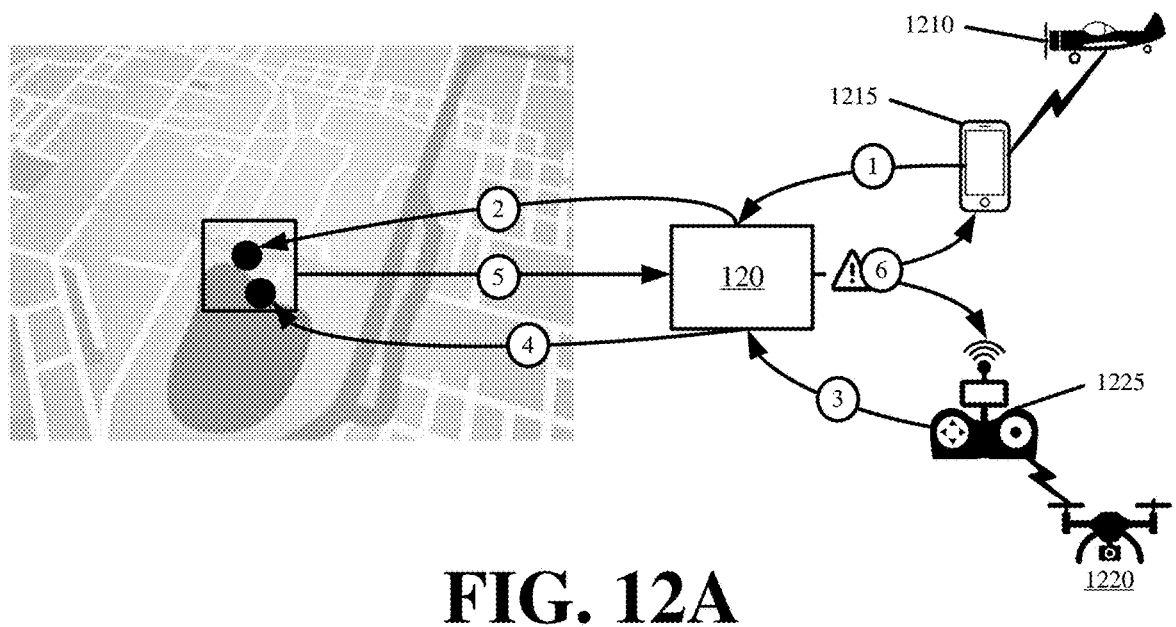
FIGS. 12A and 12B illustrate an example of enhancing the monitoring and alerting functionality of the airspace detection device by supplemental identifying information that is obtained from different devices and/or detection channels in accordance with some embodiments described herein
Figure 12B:
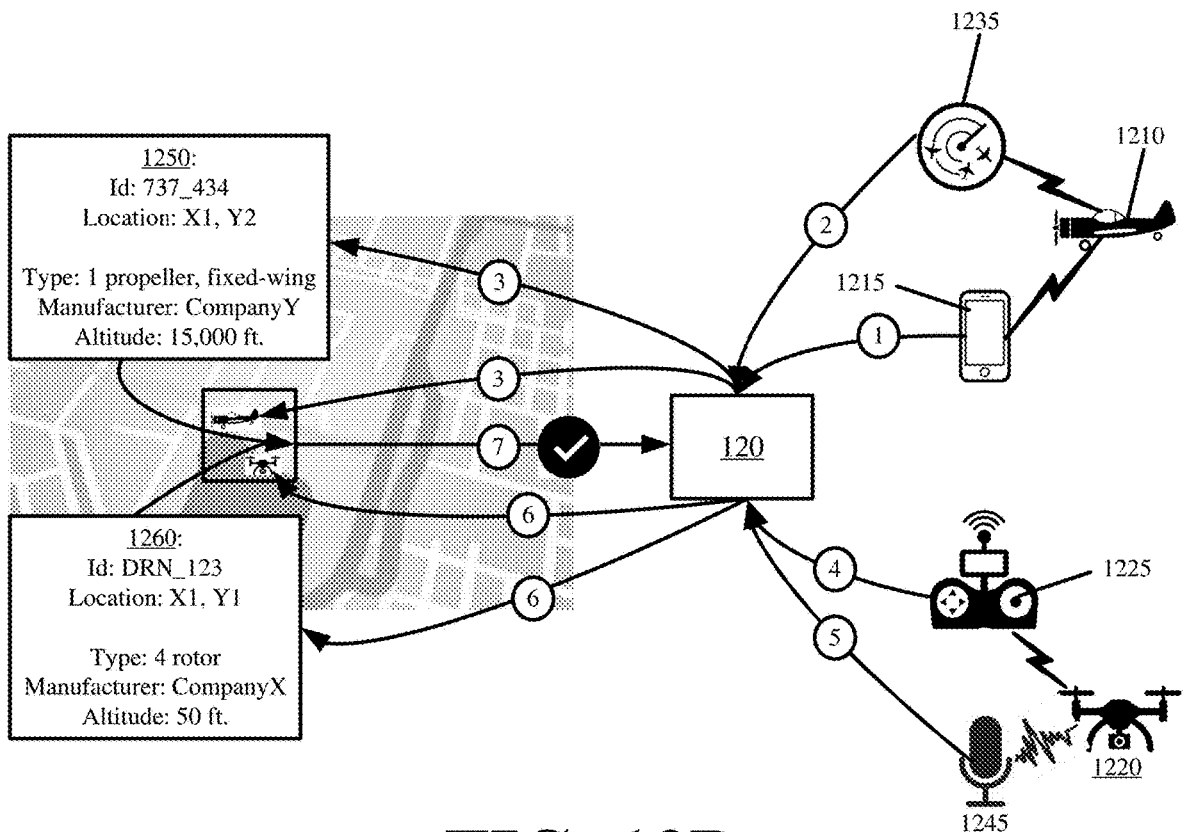

FIGS. 12A and 12B illustrate an example of enhancing the monitoring and alerting functionality of airspace detection device 120 by supplementing the identification of different aircraft with information from different devices and/or detection channel 110 in accordance with some embodiments described herein. For instance, in FIG. 12A, aircraft detection device 120 may receive (at 1) a first set of identifying information for first aircraft 1210 from first device 1215, and may detect (at 2) flight of first aircraft 1210 in a particular geographic region based on the first set of identifying information for first aircraft 1210. Aircraft detection device 120 may also receive (at 3) a first set of identifying information for second aircraft 1220 from second device 1225, and may detect (at 4) flight of second aircraft 1220 in or around the same region as the flight of first aircraft 1210 based on the first set of identifying information for second aircraft 1220.

In response to detecting and tracking first aircraft 1210 and second aircraft 1220 in or around the same region, aircraft detection device 120 may detect (at 5) the potential for airspace conflict between first aircraft 1210 and second aircraft 1220. Accordingly, aircraft detection device 120 may provide (at 6) an alert to first device 1215 and/or second device 1225. The alert may identify that two aircraft operate in or around the same airspace, and that caution should be taken to avoid collision.

Aircraft detection device 120 may provide (at 6) the alert because of insufficient identifying information for first aircraft 1210 and second aircraft 1220, wherein the insufficient information may lead to aircraft detection device 120 incorrectly detecting an airspace conflict when no such conflict exists. FIG. 12B illustrates aircraft detection device 120 receiving supplemental identifying information for first aircraft 1210 and second aircraft 1220 from third device 1235 and fourth device 1245 or from different detection channel 110, and determining that no conflict exists between first aircraft 1210 and second aircraft 1220 as a result of the supplemental identifying information.

FIG. 12B illustrates aircraft detection device 120 receiving (at 1) a first set of identifying information for first aircraft 1210 from first device 1215, and receiving (at 2) a second set of identifying information for first aircraft 1210 from third device 1235. Aircraft detection device 120 determines that there is sufficient commonality between the first and second sets of identifying information provided by first device 1215 and third device 1235 to conclude that the different sets of identifying information are for first aircraft 1210, and therefore supplement each other. Accordingly, the identifying information from the first and second sets of identifying information for first aircraft 1210 are tagged with the same identifier and entered (at 3) to the same profile 1250. The second set of identifying information supplements the first set of identifying information by identifying first aircraft 1210 to be of a first type of aircraft that flies at a first altitude.

FIG. 12B also illustrates aircraft detection device 120 receiving (at 4) a first set of identifying information for second aircraft 1220 from second device 1225, and receiving (at 5) a second set of identifying information for second aircraft 1220 from fourth device 1245. Aircraft detection device 120 determines that there is sufficient commonality between the first and second sets of identifying information provided by second device 1225 and fourth device 1245 to conclude that the different sets of identifying information are for second aircraft 1220, and therefore supplement each other. Accordingly, the identifying information from the first and second sets of identifying information for second aircraft 1220 are tagged with the same identifier and entered (at 6) to the same profile 1260. The second set of identifying information for second aircraft 1220 identifies a different second type of aircraft that flies at a different second altitude.

With the supplemental identifying information that aircraft detection device 120 obtains from third and fourth devices 1235 and 1245, aircraft detection device 1220 may determine (at 7) that first aircraft 1210 is an entirely different type of aircraft flying at an entirely different altitude than second aircraft 1220 such that there is little to no potential for the flights of these two aircraft 1210 and 1220 to conflict. Accordingly, aircraft detection device 1220 does not issue an alert about a potential airspace conflict to any of the devices, or may notify one or more of the devices that the flights of first aircraft 1210 and second aircraft 1220 are in compliance or are without conflict.

Figure 13A:
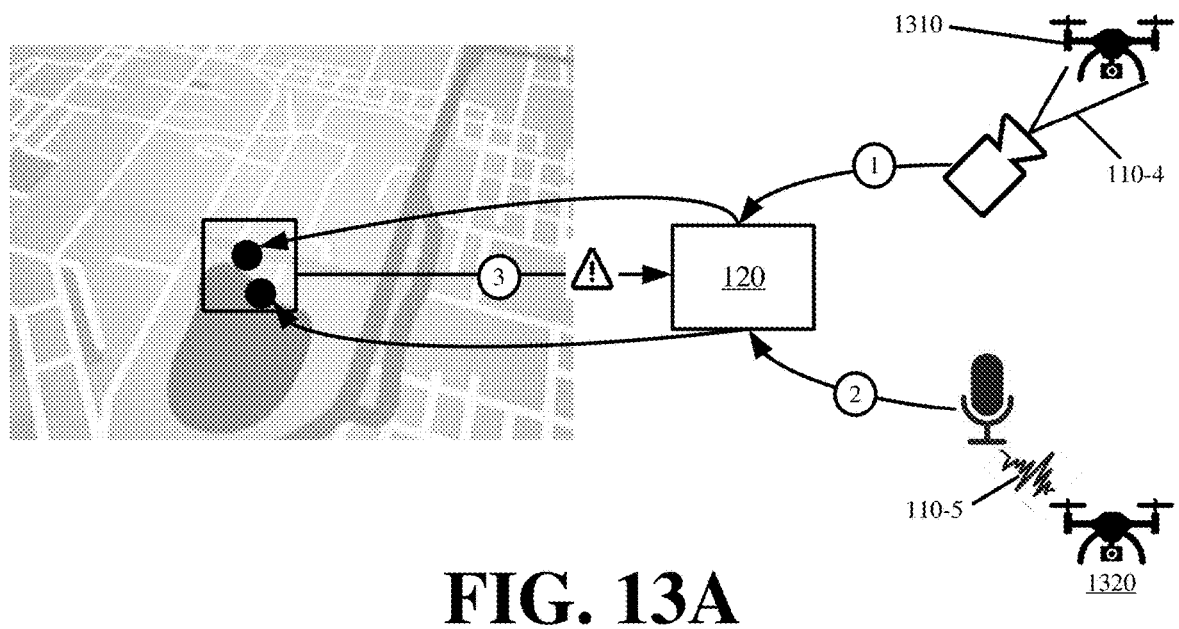
FIGS. 13A, 13B, and 13C illustrate examples of using the supplemental identifying information about different flights to enhance the monitoring, tracking, and alerting of the aircraft detection device in accordance with some embodiments described herein
Figure 13B:
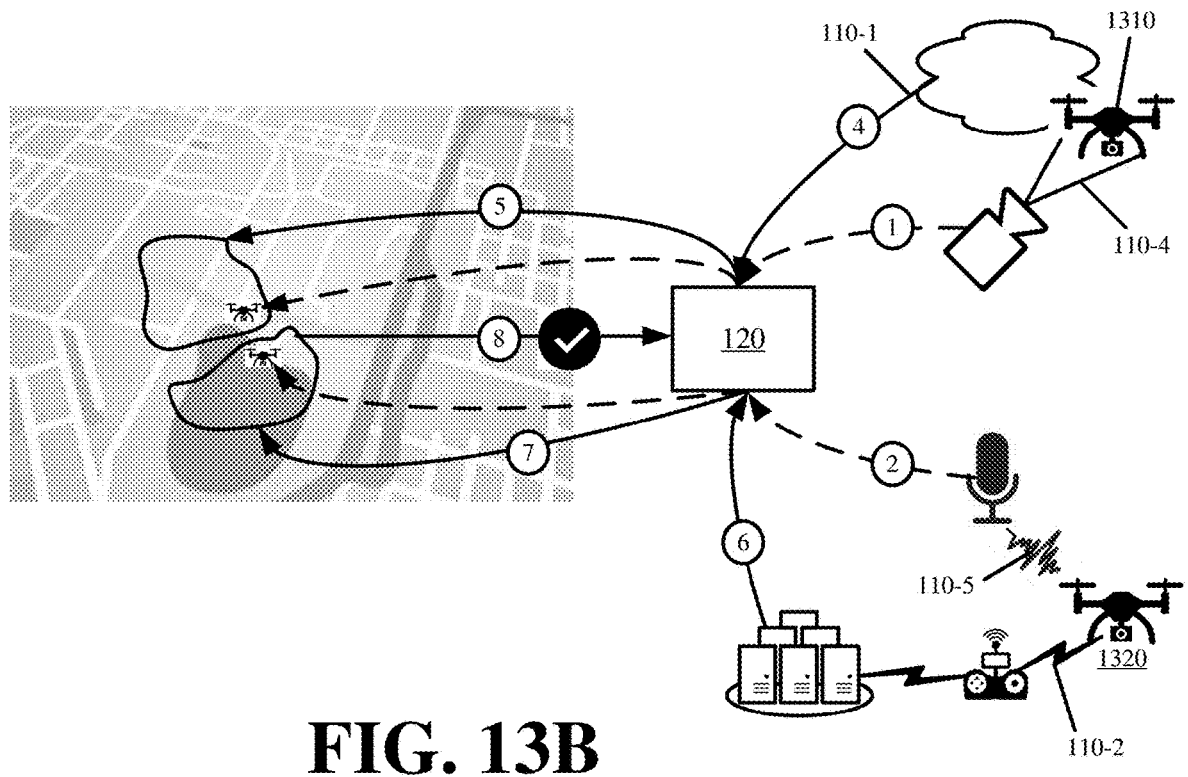
Figure 13C:
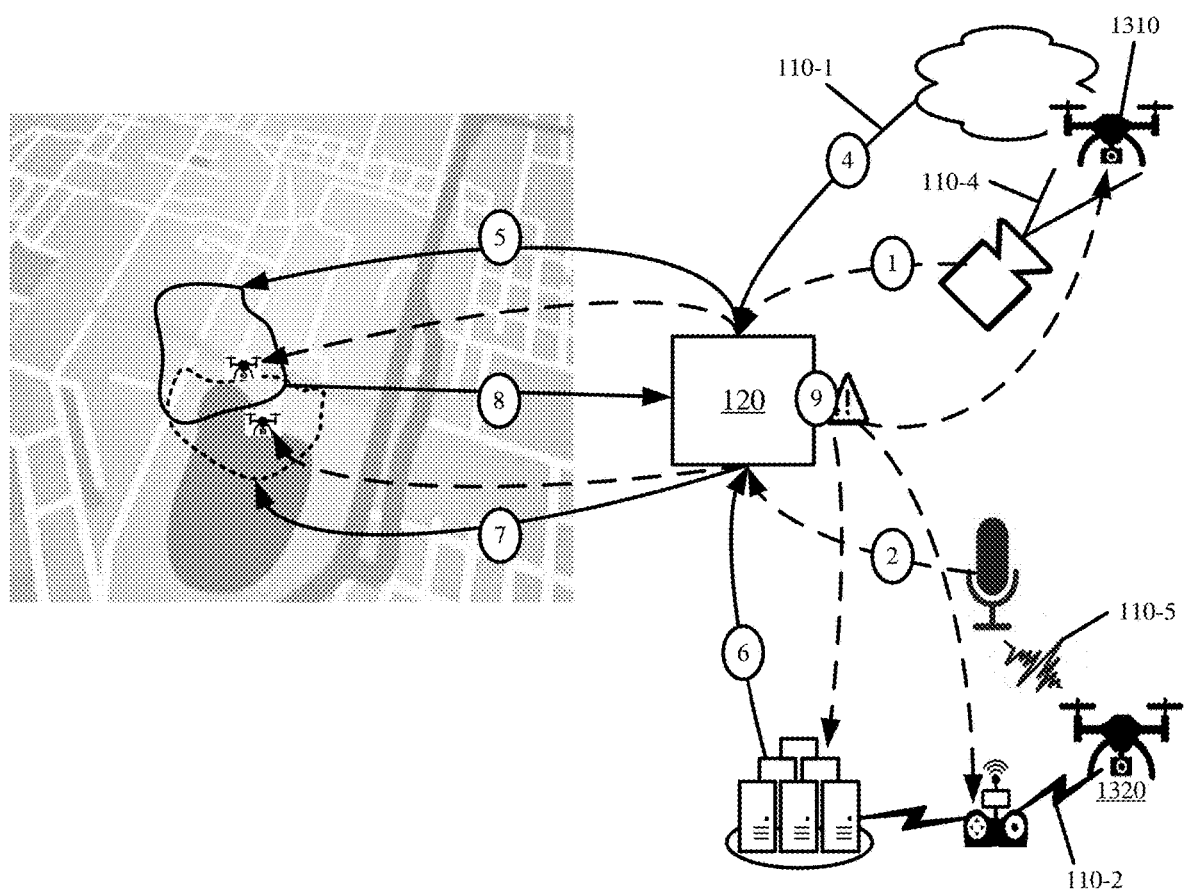

FIGS. 12A and 12B illustrate how supplemental information that can be compiled from different devices or different detection channel 110 for previously identified flights can improve the monitoring, tracking, and alerting functionality of airspace detection system 100 and/or aircraft detection device 120. FIGS. 13A, 13B, and 13C illustrate other examples of using the supplemental identifying information about different flights to enhance the monitoring, tracking, and alerting of aircraft detection device 120 in accordance with some embodiments described herein.

In FIG. 13A, aircraft detection device 120 may receive (at 1) a first set of identifying information for first aircraft 1310 via fourth detection channel 110-4, and may receive (at 2) a first set of identifying information for second aircraft 1320 via fifth detection channel 110-5. From these different first sets of identifying information, aircraft detection device 120 may determine (at 3) that an airspace conflict may exist because first aircraft 1310 and second aircraft 1320 operate in the same region of airspace.

In FIG. 13B, aircraft detection device 120 may receive (at 4), via first detection channel 110-1, a second set of identifying information for first aircraft 1310 that has commonality with the first set of identifying information for first aircraft 1310 previously received (at 1) via fourth detection channel 110-4. Accordingly, aircraft detection device 120 may use the second set of identifying information for first aircraft 1310 to supplement (at 5) the first set of identifying information with a flight plan, path, and/or trajectory of first aircraft 1310.

Similarly, aircraft detection device 120 may receive (at 6), via second detection channel 110-2, a second set of identifying information for second aircraft 1320 that has commonality with the first set of identifying information for second aircraft 1320 previously received (at 2) via fifth detection channel 110-5. Aircraft detection device 120 may use the second set of identifying information for second aircraft 1320 to supplement (at 7) the first set of identifying information with a flight plan, path, and/or trajectory of second aircraft 1310.

Aircraft detection device 120 may determine (at 8) that the flight plans, paths, or trajectories of first aircraft 1310 and second aircraft 1320 do not conflict even though the aircraft operate in or around the same airspace. Aircraft detection device 120 may then use the different detection channel 110 to track the flights of first aircraft 1310 and second aircraft 1320 to ensure that the flights remain within their flight plans. If the flights deviate from the flight plans, aircraft detection device 120 may provide alerts or notification to the flight operators. In some embodiments, aircraft detection device 120 may override the flight controls of the different aircraft to bring the flights back in compliance with the corresponding flight plans.

FIG. 13C illustrates aircraft detection device 120 receiving (at 4) a second set of identifying information for first aircraft 1310 from first detection channel 110-1 that supplements (at 5) the first set of identifying information for first aircraft 1310 with a flight plan for first aircraft 1310 that is different than the flight plan in FIG. 13B, and receiving (at 6) a second set of identifying information for second aircraft 1320 that supplements (at 7) the first set of identifying information for second aircraft 1320 with a flight plan for second aircraft 1320 that is different than the flight plan in FIG. 13B. In FIG. 13C, the flight plans confirm that the flight paths of first aircraft 1310 and second aircraft 1320 partially overlap.

In response to the detected (at 8) conflict, aircraft detection device 120 may issue (at 9) notification messaging to flight controllers, operators, or systems. In particular, first detection channel 110-1 may provide aircraft detection device 120 with a bidirectional communication channel to first aircraft 1310 such that the notifications or other messaging from aircraft detection device 120 may be directly sent to first aircraft 1310. Similarly, second detection channel 110-2 may provide aircraft detection device 120 with a bidirectional communication channel with which aircraft detection device 120 may send notifications or other messaging to a system or controller used to monitor or control flight of second aircraft 1320.

In some embodiments, aircraft detection device 120 may obtain supplemental identifying information from one or more flight databases or flight control systems. In some such embodiments, aircraft detection device 120 may compile common identifying information about a particular aircraft or flight from different devices and/or detection channel 110. For instance, aircraft detection device 120 may compile the make, model, location, flight time, trajectory, and/or other identifying information about a particular aircraft or flight from different devices and/or detection channel 110, and may use the compiled information to query a database where supplemental information as to the flight plan, flight authorizations, and/or other information can be obtained.

Figure 14:
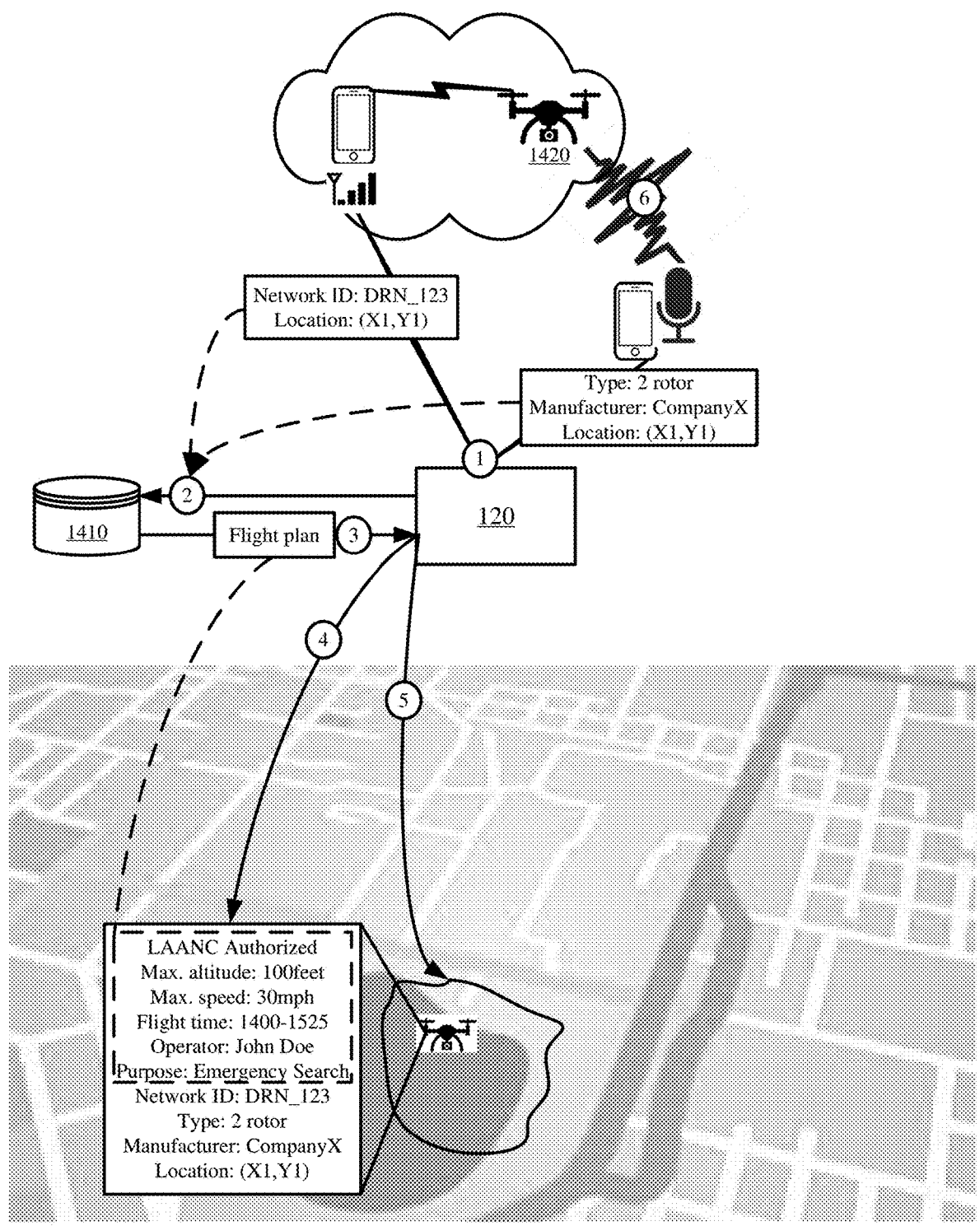
FIG. 14 illustrates an example of the aircraft detection device obtaining supplemental identifying information for a flight by querying a database using identifying information compiled for the flight from different detection channels in accordance with some embodiments described herein

FIG. 14 illustrates an example of aircraft detection device 120 obtaining supplemental identifying information for a flight by querying database 1410 using identifying information compiled for the flight from different detection channel 110 in accordance with some embodiments described herein. As shown in FIG. 14, aircraft detection device 120 may receive (at 1) different sets of identifying information via different detection channel 110 and/or from different devices, sensors, or systems. Commonality in the different sets of identifying information may indicate that the different sets of identifying information relate to the same aircraft 1420 or flight, and can therefore be combined in a profile identifying aircraft 1420 or its corresponding flight.

Detection channel 110 may, however, provide basic identifying information about aircraft 1420. For instance, the identifying information that aircraft detection device 120 compiles from detection channel 110 may identify a flight location, aircraft type, aircraft manufacturer, and an identifier for the network that is created to communicate with aircraft 1420.

Aircraft detection device 120 may query (at 2) database 1410 using the identifying information that is compiled from detection channel 110. Database 1410 may return (at 3) supplemental identifying information about aircraft 1420 or the corresponding flight in response to the query. In some embodiments, the supplemental identifying information may include a flight plan, flight parameters, flight authorizations, and/or other identifying information that may not be obtained from detection channel 110. Aircraft detection device 120 may update (at 4) the profile created for aircraft 1420 with the supplemental identifying information, and may update (at 5) the dynamic airspace map to incorporate or account for the supplemental identifying information. For instance, in FIG. 14, aircraft detection device 120 may present (at 5) the flight path or authorized flight area for aircraft 1420 on the dynamic airspace map.

In some embodiments, aircraft detection device 120 may selectively query different databases 1410 based on the identifying information that is compiled from different detection channel 110. For instance, aircraft detection device 120 may identify a first company, first flight operator, or first aircraft based on the compiled identifying information, and may query a first database that stores supplemental identifying information for the first company, first flight operator, or first aircraft. Similarly, aircraft detection device 120 may identify a second company, second flight operator, or second aircraft based on the compiled identifying information, and may query a different second database that stores supplemental identifying information for the second company, second flight operator, or second aircraft.

Database 1410 may therefore represent one or more databases from different flight control systems or flight planning systems that different customers, companies, or other entities use to manage their fleet of aircraft or flights. Database 1410 may, alternatively or additionally, include one or more databases of flight regulatory agencies or flight authorization agencies, such as the Federal Aviation Administration ("FAA"), that different aircraft operators submit flight plans to for approval, authorization, and/or other reasons.

In some embodiments, the supplemental identifying information from database 1410 may enhance the reporting function of aircraft detection device 120. For instance, the supplemental identifying information may provide telephone numbers, addressing, and/or other identifiers with which aircraft detection device 120 may alert different operators of different identified flights.

Figure 15:
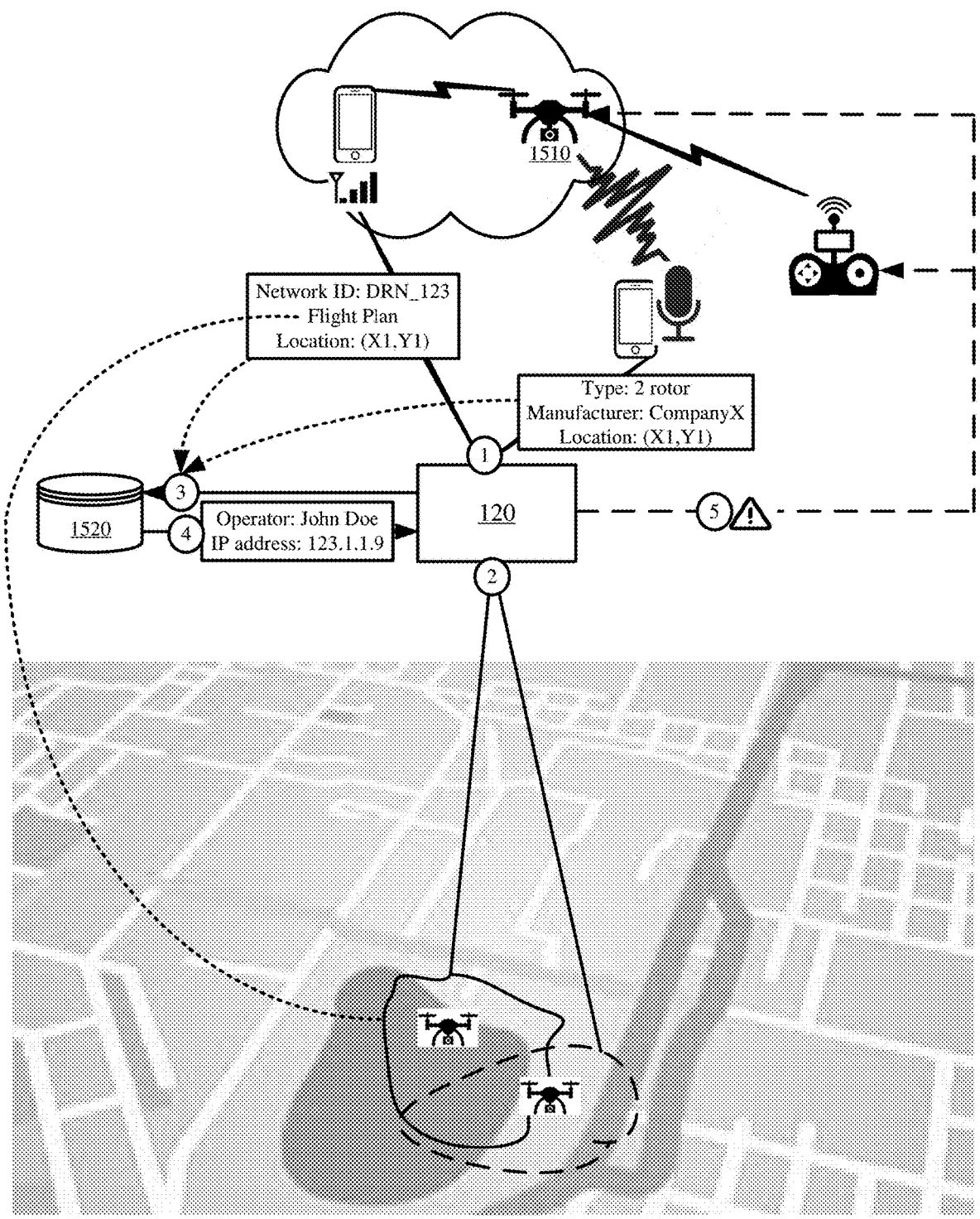
FIG. 15 illustrates an example of enhancing the reporting function of the aircraft detection device based on identifying information that is compiled from different detection channels in accordance with some embodiments described herein.

FIG. 15 illustrates an example of enhancing the reporting function of aircraft detection device 120 based on identifying information that is compiled from different detection channels in accordance with some embodiments described herein. As was shown in FIG. 14, FIG. 15 illustrates aircraft detection device 120 receiving (at 1) different sets of identifying information via different detection channel 110 and/or from different devices, sensors, or systems. Commonality in the different sets of identifying information may indicate that the different sets of identifying information relate to the same aircraft 1510 or flight, and can therefore be combined in a profile identifying aircraft 1510 or its corresponding flight.

Aircraft detection device 120 may determine (at 2) that a flight plan, path, or trajectory for aircraft 1510 specified within the compiled set of identifying information may potentially conflict with the flight plan, path, or trajectory of another aircraft flying in the same airspace at or near the same time. The potential conflict may be detected based on the compiled set of identifying information for aircraft 1510 matching one or more elements specified as part of identifying information previously obtained for the other aircraft via one or more detection channel 110 and/or one or more other devices, sensors, or systems.

The compiled set of identifying information for aircraft 1510 may be obtained from detection channel 110 and/or third-party sources that do not include a communication path back to a controller, operator, or system in communication with or in control of aircraft 1510. In other words, the compiled set of identifying information for aircraft 1510 may not include a telephone number, address, and/or other identifier with which aircraft detection device 120 may communicate the conflict or other messages to a controller, operator, or system in communication with or in control of aircraft 1510. Accordingly, aircraft detection device 120 may query (at 3) database 1520 using the compiled set of identifying information for aircraft 1510 to obtain (at 4) supplemental information for contacting a controller, operator, or system in communication with or in control of aircraft 1510.

As shown in FIG. 15, aircraft detection device 120 may provide (at 3) the identified location of aircraft 1510, the make and model of aircraft 1510, and the name or identifier of a company operating aircraft 1510 as part of the query to database 1520. In some embodiments, the name or identifier of the company may be determined from decoding a message that is conveyed based on a sequence of flashing lights on aircraft 1510 obtained using fourth detection channel 110-4.

In response to the query, database 1520 may provide (at 4) aircraft detection device 120 with an IP address that aircraft detection device 120 may use to directly communicate with a controller, operator, or system in communication with or in control of aircraft 1510. Aircraft detection device 120 may issue (at 5) an alert or other message to the IP address over a data network in order to notify the controller, operator, or system of the potential issue and/or other information. For instance, aircraft detection device 120 may provide (at 5) the flight plan of the conflicting flight to the controller, operator, or system so that adjustments can be made to aircraft 1510 to avoid collision or possibility of a collision. Alternatively, aircraft detection device 120 may track the flight of each aircraft, and may use the IP address to provide (at 5) the controller, operator, or system with real-time information about other flights operating in the same region of airspace. In some embodiments, aircraft detection device 120 may use the IP address to establish a wireless network connection over an LTE, 5G, or other long-range wireless network to aircraft 1510, and may override or control flight of aircraft 1510 by passing flight commands over the network connection.

Figure 16:
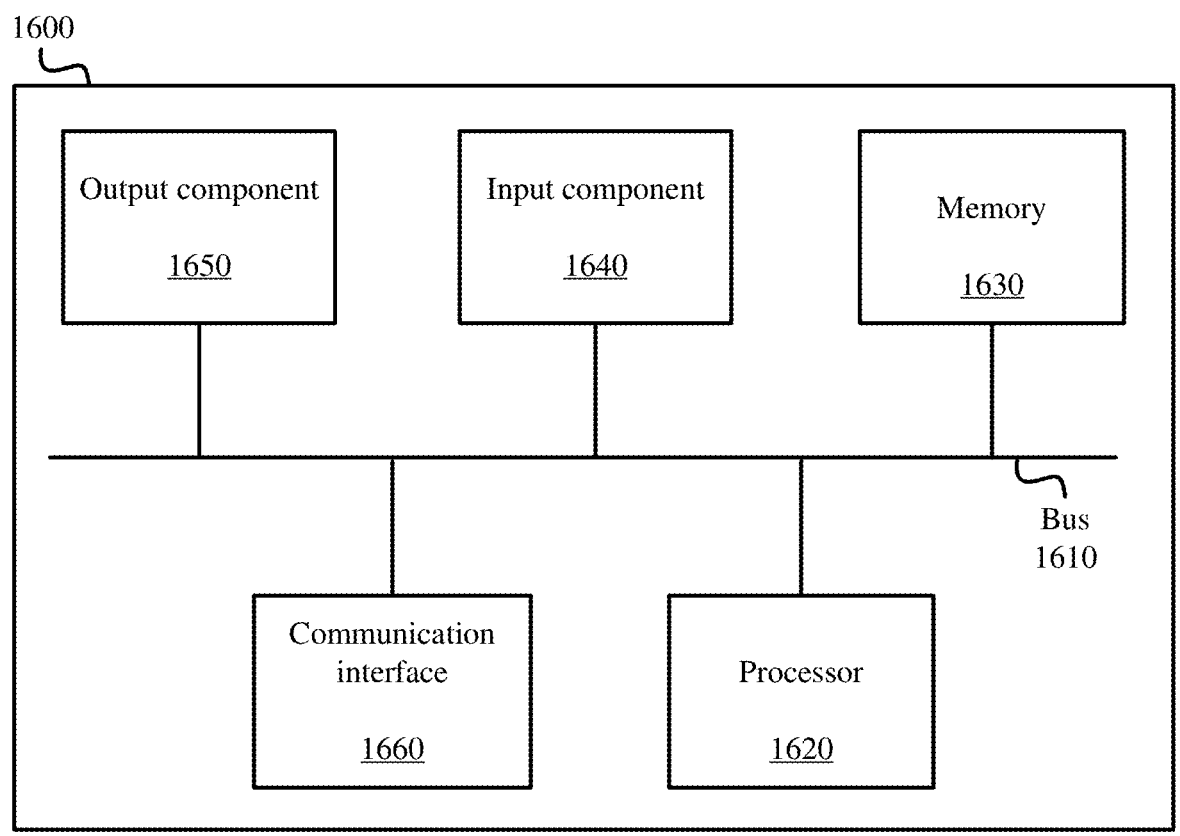
FIG. 16 illustrates example components of one or more devices, according to one or more embodiments described herein.

FIG. 16 is a diagram of example components of device 1600. Device 1600 may be used to implement aircraft detection device 120 and/or the distributed set of devices and sensors of aircraft detection system 100. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    obtaining a first set of identifying information about a particular aircraft or flight via a first detection channel at a first time;
    determining that the first set of identifying information lacks commonality with previously received sets of identifying information for other detected aircraft or flights;
    tracking the particular aircraft or flight based on the first set of identifying information;
    obtaining a second set of identifying information about the particular aircraft or flight via a different second detection channel at a second time that is after the first time;
    determining commonality between the second set of identifying information and the first set of identifying information; and
    updating said tracking of the particular aircraft or flight with identifying information from the second set of identifying information that is not present in the first set of identifying information.

2. The method of claim 1 further comprising:
    generating a dynamic airspace map with a first representation of the particular aircraft or flight at the first time based on the first set of identifying information.

3. The method of claim 2 further comprising:
    modifying the dynamic airspace map with a different second representation of the particular aircraft or flight at the second time, wherein the second representation provides identifying information of the particular aircraft or flight that is present in the second set of identifying information and that is not present in the first set of identifying information.

4. The method of claim 1 further comprising:
    generating a unique identifier for the particular aircraft or flight in response to determining that the first set of identifying information lacks commonality with previously received sets of identifying information;
    tagging the first set of identifying information with the unique identifier; and
    tagging the second set of identifying information with the unique identifier in response to determining commonality between the second set of identifying information and the first set of identifying information.

5. The method of claim 1, wherein said determining commonality further comprises:
    generating a confidence score based on an amount of temporal, locational, originator, or elemental commonality between the first set of identifying information and the second set of identifying information; and
    matching the second set of identifying information to the particular aircraft or flight in response to the confidence score satisfying a threshold.

6. The method of claim 1,
    wherein said obtaining the first set of identifying information comprises receiving the first set of identifying information from a first device, sensor, or system monitoring the first detection channel; and
    wherein said obtaining the second set of identifying information comprises receiving the second set of identifying information from a different second device, sensor, or system monitoring the second detection channel.

7. The method of claim 1,
wherein the first detection channel comprises one of a wireless signaling from the particular aircraft, a device directly connected to the particular aircraft, messaging broadcast from the particular aircraft, sight, sound, or a flight tracking system; and
wherein the second detection channel comprises a different one of the wireless signaling from the particular aircraft, the device directly connected to the particular aircraft, messaging broadcast from the particular aircraft, sight, sound, or the flight tracking system.

8. The method of claim 1 further comprising:
querying a database based on one or more of the first and second sets of identifying information;
receiving a third set of identifying information for the particular aircraft or flight in response to said querying; and
supplementing said tracking of the particular aircraft or flight by including the third set of identifying information with the first and second sets of identifying information.

9. The method of claim 1 further comprising:
detecting a conflict between the particular aircraft and another aircraft in response to said updating;
identifying an element from the first or second sets of identifying information with which to contact a controller, operator, or system in communication with or in control of the particular aircraft; and
providing a message to the controller, operator, or system using said element.

10. The method of claim 1 further comprising:
detecting a conflict between the particular aircraft and another aircraft in response to said updating;
querying a database based on one or more of the first and second sets of identifying information;
receiving from the database, in response to said querying, an element with which to contact a controller, operator, or system in communication with or in control of the particular aircraft; and
providing a message to the controller, operator, or system using said element.

11. The method of claim 1 further comprising:
generating a profile about the particular aircraft or flight based on the first set of identifying information at the first time; and
supplementing the profile with additional information about the particular aircraft or flight based on the second set of identifying information at the second time.

12. The method of claim 1,
wherein the first set of identifying information comprises one or more images or sounds of the particular aircraft; and
wherein the second set of identifying information comprises wireless data packets or wireless signaling received from the particular aircraft over a wireless network.

13. The method of claim 12 further comprising:
detecting one or more of a type, make, and model of the particular aircraft based on the one or more images or sounds of the particular aircraft; and
detecting a flight plan or flight status of the particular aircraft based on the wireless data packets.

14. A device comprising:
a non-transitory computer-readable medium storing a set of processor-executable instructions; and
one or more processors configured to execute the set of processor-executable instructions, wherein executing the set of processor-executable instructions causes the one or more processors to:
obtain a first set of identifying information about a particular aircraft or flight via a first detection channel at a first time;
determine that the first set of identifying information lacks commonality with previously received sets of identifying information for other detected aircraft or flights;
track the particular aircraft or flight based on the first set of identifying information;
obtain a second set of identifying information about the particular aircraft or flight via a different second detection channel at a second time that is after the first time;
determine commonality between the second set of identifying information and the first set of identifying information; and
update said tracking of the particular aircraft or flight with identifying information from the second set of identifying information that is not present in the first set of identifying information.

15. The device of claim 14, wherein the processor-executable instructions further include processor-executable instructions to:
generate a dynamic airspace map with a first representation of the particular aircraft or flight at the first time based on the first set of identifying information.

16. The device of claim 15, wherein the processor-executable instructions further include processor-executable instructions to:
modify the dynamic airspace map with a different second representation of the particular aircraft or flight at the second time, wherein the second representation provides identifying information of the particular aircraft or flight that is present in the second set of identifying information and that is not present in the first set of identifying information.

17. The device of claim 14, wherein the processor-executable instructions further include processor-executable instructions to:
query a database based on one or more of the first and second sets of identifying information;
receive a third set of identifying information for the particular aircraft or flight in response to said querying; and
supplement said tracking of the particular aircraft or flight by including the third set of identifying information with the first and second sets of identifying information.

18. The device of claim 14, wherein the processor-executable instructions further include processor-executable instructions to:
generate a profile about the particular aircraft or flight based on the first set of identifying information at the first time; and
supplement the profile with additional information about the particular aircraft or flight based on the second set of identifying information at the second time.

19. A non-transitory computer-readable medium, storing a set of processor-executable instructions, which, when executed by one or more processors, cause the one or more processors to:
- obtain a first set of identifying information about a particular aircraft or flight via a first detection channel at a first time;
- determine that the first set of identifying information lacks commonality with previously received sets of identifying information for other detected aircraft or flights;
- track the particular aircraft or flight based on the first set of identifying information;
- obtain a second set of identifying information about the particular aircraft or flight via a different second detection channel at a second time that is after the first time;
- determine commonality between the second set of identifying information and the first set of identifying information; and
- update said tracking of the particular aircraft or flight with identifying information from the second set of identifying information that is not present in the first set of identifying information.

20. The non-transitory computer-readable medium of claim 19, wherein the processor-executable instructions further include processor-executable instructions to:
- generate a dynamic airspace map with a first representation of the particular aircraft or flight at the first time based on the first set of identifying information; and
- modify the dynamic airspace map with a different second representation of the particular aircraft or flight at the second time, wherein the second representation provides identifying information of the particular aircraft or flight that is present in the second set of identifying information and that is not present in the first set of identifying information.

* * * * *